United States Patent
Balasubramanian et al.

(10) Patent No.: US 11,985,498 B2
(45) Date of Patent: May 14, 2024

(54) SECURE SIDELINK COMMUNICATIONS

(71) Applicant: QUALCOMM Incorporated, San Diego, CA (US)

(72) Inventors: Anantharaman Balasubramanian, San Diego, CA (US); Shailesh Patil, San Diego, CA (US); Hong Cheng, Basking Ridge, NJ (US); Gene Wesley Marsh, San Diego, CA (US); Shuanshuan Wu, San Diego, CA (US); Kapil Gulati, Belle Mead, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 155 days.

(21) Appl. No.: 17/451,526

(22) Filed: Oct. 20, 2021

(65) Prior Publication Data
US 2023/0117432 A1    Apr. 20, 2023

(51) Int. Cl.
*H04W 12/037* (2021.01)
*H04L 9/14* (2006.01)
*H04W 12/041* (2021.01)
*H04W 76/10* (2018.01)
*H04W 92/16* (2009.01)

(52) U.S. Cl.
CPC ............ *H04W 12/037* (2021.01); *H04L 9/14* (2013.01); *H04W 12/041* (2021.01); *H04W 76/10* (2018.02); *H04W 92/16* (2013.01)

(58) Field of Classification Search
CPC . H04W 12/037; H04W 12/041; H04W 76/10; H04W 92/16; H04L 9/14
See application file for complete search history.

(56) References Cited

U.S. PATENT DOCUMENTS

| 2020/0288535 A1 | 9/2020 | Sharma et al. |
| 2021/0051005 A1* | 2/2021 | Kunz ................. H04W 12/033 |
| 2023/0007478 A1* | 1/2023 | Chen .................... H04L 9/0897 |

FOREIGN PATENT DOCUMENTS

| CN | 112399369 A | 2/2021 |
| EP | 3571804 A1 | 11/2019 |
| WO | WO-2021179331 A1 * | 9/2021 ............ H04W 12/03 |

OTHER PUBLICATIONS

Jacovic, Marko & Juretus, Kyle & Kandasamy, Nagarajan & Savidis, Ioannis & Dandekar, Kapil. (2020). Physical Layer Encryption for Wireless OFDM Communication Systems. Journal of Hardware and Systems Security. 16 Pages.*
International Search Report and Written Opinion—PCT/US2022/042229—ISA/EPO—dated Nov. 29, 2022.

* cited by examiner

*Primary Examiner* — Matthew T Henning
(74) *Attorney, Agent, or Firm* — Harrity & Harrity, LLP

(57) ABSTRACT

Various aspects of the present disclosure generally relate to wireless communication. In some aspects, a first user equipment (UE) may receive, from a base station or a roadside unit (RSU), information associated with one or more security keys for sidelink communications, wherein the information includes at least one of a base key, the one or more security keys, or one or more parameters for deriving the one or more security keys. The UE may transmit, to a second UE, a sidelink communication that is scrambled using a security key of the one or more security keys. Numerous other aspects are described.

30 Claims, 11 Drawing Sheets

SECURE SIDELINK COMMUNICATIONS

FIELD OF THE DISCLOSURE

Aspects of the present disclosure generally relate to wireless communication and to techniques and apparatuses for secure sidelink communications.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a first user equipment (UE) for wireless communication. The first UE may include a memory and one or more processors coupled to the memory. The one or more processors may be configured to receive, from a base station or a roadside unit (RSU), information associated with one or more security keys for sidelink communications, wherein the information includes at least one of a base key, the one or more security keys, or one or more parameters for deriving the one or more security keys. The one or more processors may be configured to transmit, to a second UE, a sidelink communication that is scrambled using a security key of the one or more security keys.

Some aspects described herein relate to a method of wireless communication performed by a first UE. The method may include receiving, from a base station or an RSU, information associated with one or more security keys for sidelink communications, wherein the information includes at least one of a base key, the one or more security keys, or one or more parameters for deriving the one or more security keys. The method may include transmitting, to a second UE, a sidelink communication that is scrambled using a security key of the one or more security keys.

Some aspects described herein relate to a non-transitory computer-readable medium that stores a set of instructions for wireless communication by a UE. The set of instructions, when executed by one or more processors of the first UE, may cause the first UE to receive, from a base station or an RSU, information associated with one or more security keys for sidelink communications, wherein the information includes at least one of a base key, the one or more security keys, or one or more parameters for deriving the one or more security keys. The set of instructions, when executed by one or more processors of the first UE, may cause the first UE to transmit, to a second UE, a sidelink communication that is scrambled using a security key of the one or more security keys.

Some aspects described herein relate to an apparatus for wireless communication. The apparatus may include means for receiving, from a base station or an RSU, information associated with one or more security keys for sidelink communications, wherein the information includes at least one of a base key, the one or more security keys, or one or more parameters for deriving the one or more security keys. The apparatus may include means for transmitting, to a UE, a sidelink communication that is scrambled using a security key of the one or more security keys.

Some aspects described herein relate to a first UE for wireless communication. The first UE may include a memory and one or more processors coupled to the memory. The one or more processors may be configured to receive, from a base station or an RSU, information associated with one or more security keys for sidelink communications, wherein the information includes at least one of a base key, the one or more security keys, or one or more parameters for deriving the one or more security keys. The one or more processors may be configured to receive, from a second UE, a sidelink communication that is scrambled using a security key of the one or more security keys. The one or more processors may be configured to decode the sidelink communication based at least in part on at least one of the security key or the information.

Some aspects described herein relate to a method of wireless communication performed by a first UE. The method may include receiving, from a base station or an RSU, information associated with one or more security keys for sidelink communications, wherein the information includes at least one of a base key, the one or more security keys, or one or more parameters for deriving the one or more security keys. The method may include receiving, from a second UE, a sidelink communication that is scrambled using a security key of the one or more security keys. The method may include decoding the sidelink communication based at least in part on at least one of the security key or the information.

Some aspects described herein relate to a non-transitory computer-readable medium that stores a set of instructions for wireless communication by a first UE. The set of instructions, when executed by one or more processors of the first UE, may cause the first UE to receive, from a base station or an RSU, information associated with one or more security keys for sidelink communications, wherein the information includes at least one of a base key, the one or more security keys, or one or more parameters for deriving the one or more security keys. The set of instructions, when executed by one or more processors of the first UE, may cause the first UE to receive, from a second UE, a sidelink communication that is scrambled using a security key of the one or more security keys. The set of instructions, when executed by one or more processors of the first UE, may cause the first UE to decode the sidelink communication based at least in part on at least one of the security key or the information.

Some aspects described herein relate to an apparatus for wireless communication. The apparatus may include means for receiving, from a base station or an RSU, information associated with one or more security keys for sidelink communications, wherein the information includes at least one of a base key, the one or more security keys, or one or more parameters for deriving the one or more security keys. The apparatus may include means for receiving, from a UE, a sidelink communication that is scrambled using a security key of the one or more security keys. The apparatus may include means for decoding the sidelink communication based at least in part on at least one of the security key or the information.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
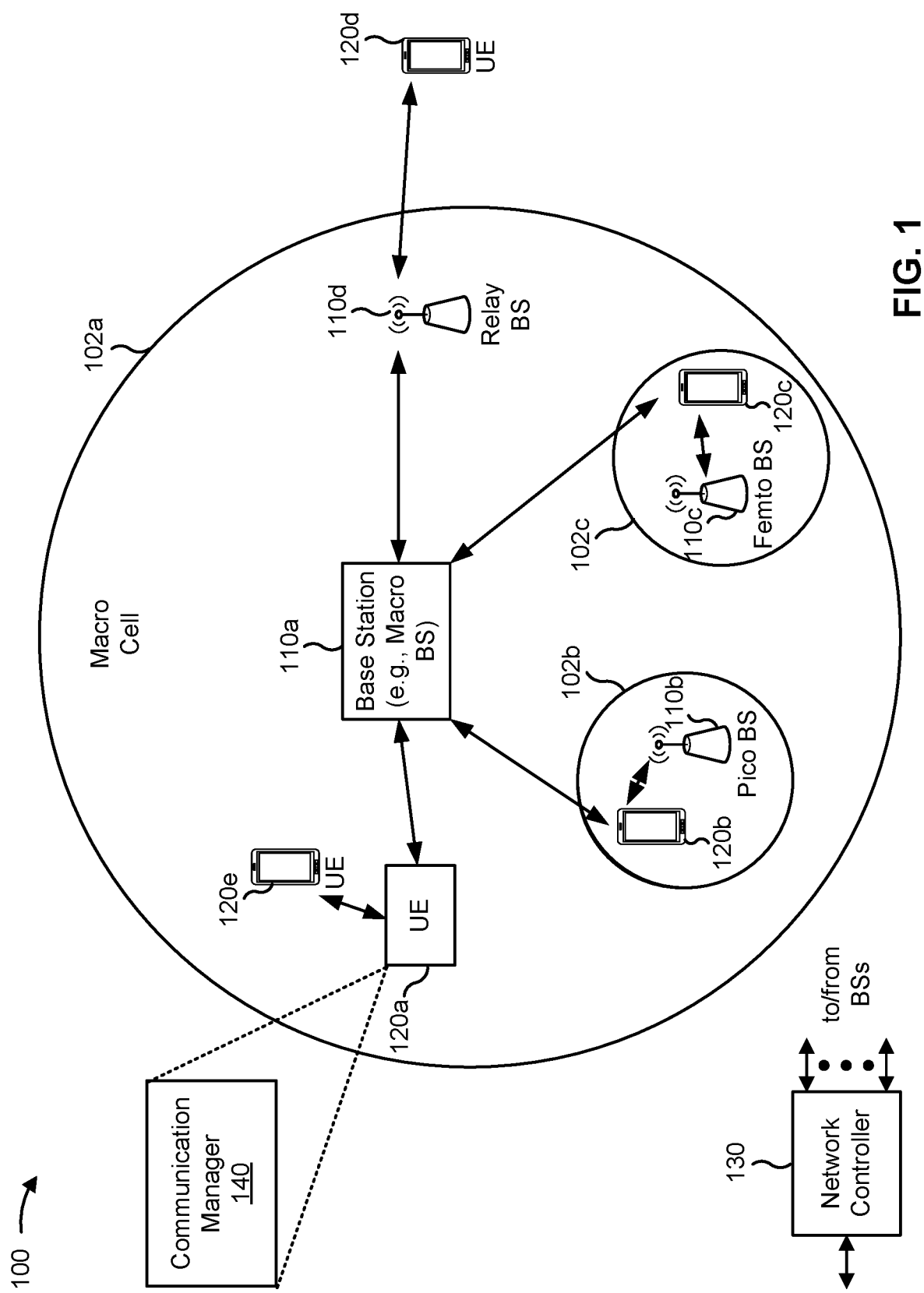
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive, from a base station or a roadside unit (RSU), information associated with one or more security keys for sidelink communications, wherein the information includes at least one of a base key, the one or more security keys, or one or more parameters for deriving the one or more security keys; and transmit, to a second UE 120, a sidelink communication that is scrambled using a security key of the one or more security keys.

In some aspects, as described in more detail elsewhere herein, the communication manager 140 may receive, from a base station or an RSU, information associated with one or more security keys for sidelink communications, wherein the information includes at least one of a base key, the one or more security keys, or one or more parameters for deriving the one or more security keys; receive, from a second UE 120, a sidelink communication that is scrambled using a security key of the one or more security keys; and decode the sidelink communication based at least in part on at least one of the security key or the information. Additionally, or alternatively, the communication manager 140 may perform one or more other operations described herein.

As indicated above, FIG. 1 is provided as an example. Other examples may differ from what is described with regard to FIG. 1.

Figure 2:
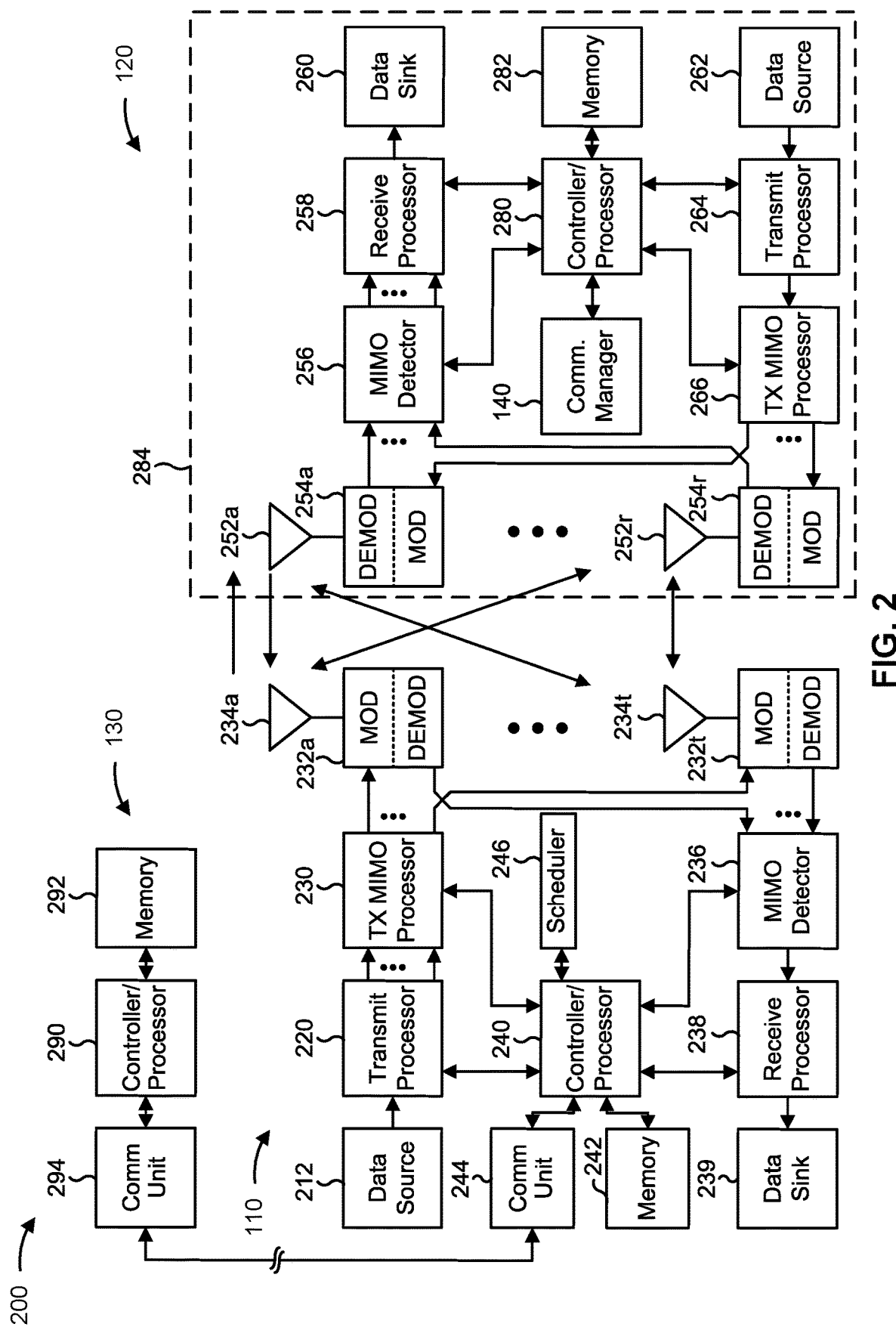
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6-11).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6-11).

The controller/processor 240 of the base station 110, the controller/processor 280 of the UE 120, and/or any other component(s) of FIG. 2 may perform one or more techniques associated with secure sidelink communications, as described in more detail elsewhere herein. For example, the controller/processor 240 of the base station 110, the controller/processor 280 of the UE 120, and/or any other component(s) of FIG. 2 may perform or direct operations of, for example, process 800 of FIG. 8, process 900 of FIG. 9, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, the UE 120 includes means for receiving, from a base station or an RSU, information associated with one or more security keys for sidelink communications, wherein the information includes at least one of a base key, the one or more security keys, or one or more parameters for deriving the one or more security keys; and/or means for transmitting, to a second UE, a sidelink communication that is scrambled using a security key of the one or more security keys. In some aspects, the UE 120 includes means for receiving, from a base station or an RSU, information associated with one or more security keys for sidelink communications, wherein the information includes at least one of a base key, the one or more security keys, or one or more parameters for deriving the one or more security keys; means for receiving, from a second UE, a sidelink communication that is scrambled using a security key of the one or more security keys; and/or means for decoding the sidelink communication based at least in part on at least one of the security key or the information. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
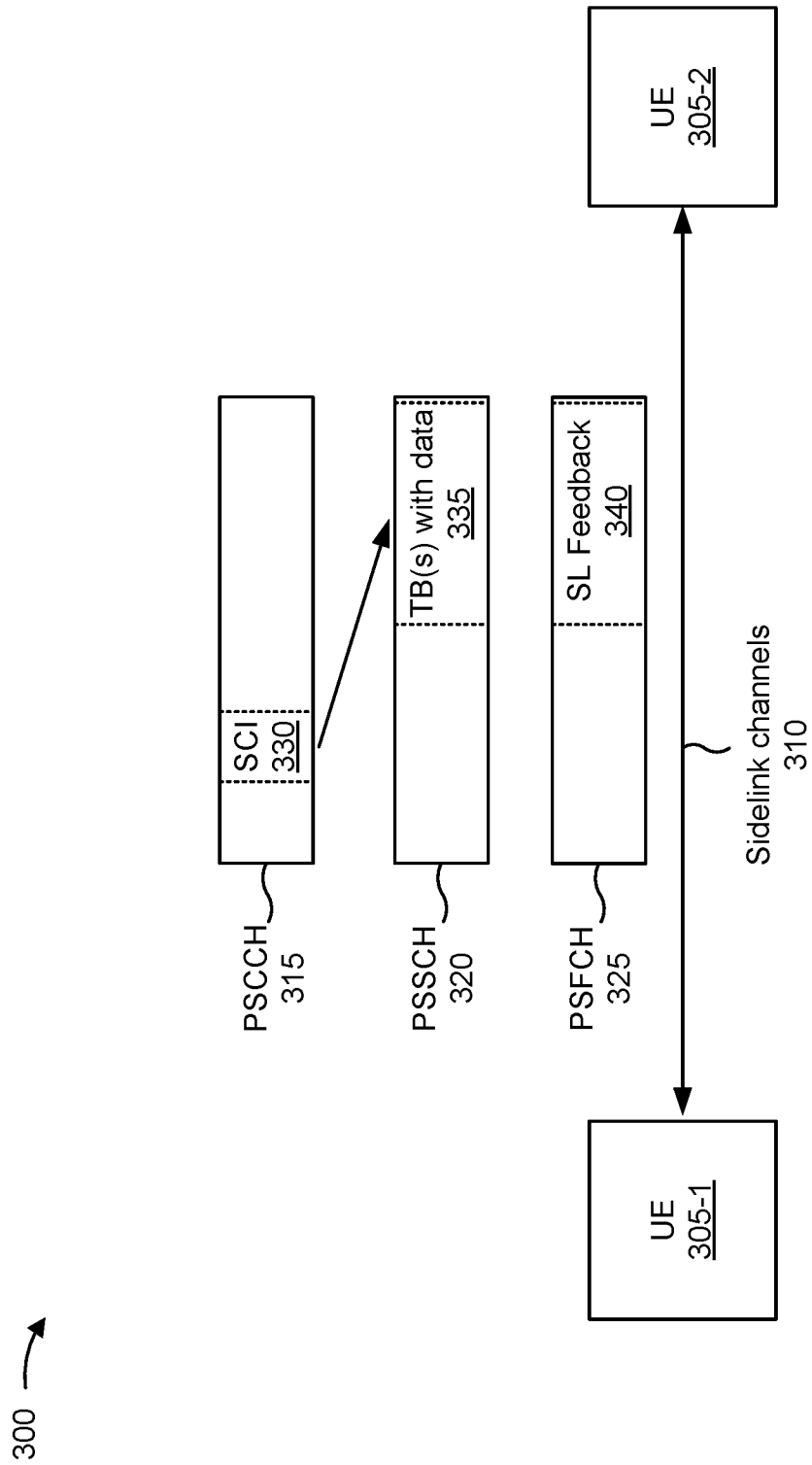
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, and/or V2P communications) and/or mesh networking. In some examples, the UEs 305 (e.g., UE 305-1 and/or UE 305-2) may correspond to one or more other UEs described elsewhere herein, such as UE 120. In some examples, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, or symbols) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, and/or spatial resources) where a transport block (TB) 335 may be carried on the PSSCH 320. The TB 335 may include data. The PSFCH 325 may be used to communicate sidelink feedback 340, such as hybrid automatic repeat request (HARD) feedback (e.g., acknowledgement or negative acknowledgement (ACK/NACK) information), transmit power control (TPC), and/or a scheduling request (SR).

Although shown on the PSCCH 315, in some examples, the SCI 330 may include multiple communications in different stages, such as a first stage SCI (SCI-1) and a second stage SCI (SCI-2). The SCI-1 may be transmitted on the PSCCH 315. The SCI-2 may be transmitted on the PSSCH 320. The SCI-1 may include, for example, an indication of one or more resources (e.g., time resources, frequency resources, and/or spatial resources) on the PSSCH 320, information for decoding sidelink communications on the PSSCH, a quality of service (QoS) priority value, a resource reservation period, a PSSCH DMRS pattern, an SCI format for the SCI-2, a beta offset for the SCI-2, a quantity of PSSCH DMRS ports, and/or an MCS. The SCI-2 may include information associated with data transmissions on the PSSCH 320, such as a HARQ process ID, a new data indicator (NDI), a source identifier, a destination identifier, and/or a channel state information (CSI) report trigger.

In some examples, the one or more sidelink channels 310 may use resource pools. For example, a scheduling assignment (e.g., included in SCI 330) may be transmitted in sub-channels using specific resource blocks (RBs) across time. In some examples, data transmissions (e.g., on the PSSCH 320) associated with a scheduling assignment may occupy adjacent RBs in the same subframe as the scheduling assignment (e.g., using frequency division multiplexing). In some examples, a scheduling assignment and associated data transmissions are not transmitted on adjacent RBs.

In some examples, a UE 305 may operate using a sidelink transmission mode (e.g., Mode 1) where resource selection and/or scheduling is performed by a base station 110. For example, the UE 305 may receive a grant (e.g., in downlink control information (DCI) or in a radio resource control (RRC) message, such as for configured grants) from the base station 110 for sidelink channel access and/or scheduling. In some examples, a UE 305 may operate using a transmission mode (e.g., Mode 2) where resource selection and/or scheduling is performed by the UE 305 (e.g., rather than a base station 110). In some examples, the UE 305 may perform resource selection and/or scheduling by sensing channel availability for transmissions. For example, the UE 305 may measure an RSSI parameter (e.g., a sidelink-RSSI (S-RSSI) parameter) associated with various sidelink channels, may measure an RSRP parameter (e.g., a PSSCH-RSRP parameter) associated with various sidelink channels, and/or may measure an RSRQ parameter (e.g., a PSSCH-RSRQ parameter) associated with various sidelink channels, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources and/or channel parameters. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, and/or an MCS to be used for the upcoming sidelink transmission. In some examples, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
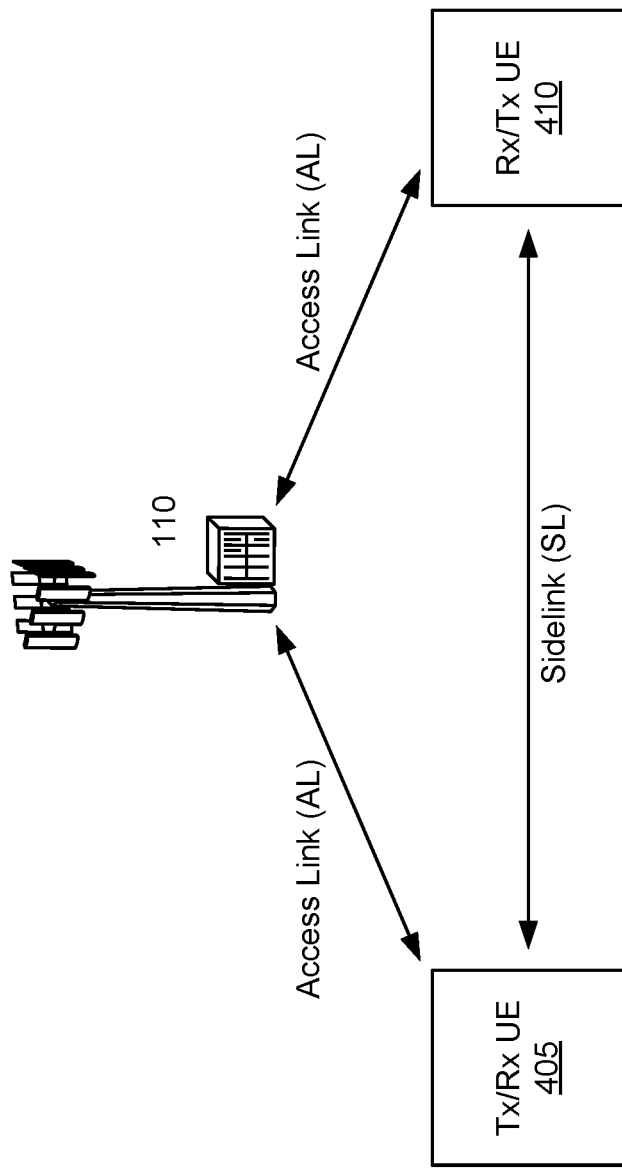
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a base station 110 may communicate with the Tx/Rx UE 405 via a first access link. Additionally, or alternatively, in some sidelink modes, the base station 110 may communicate with the Rx/Tx UE 410 via a second access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 4 is provided as an example. Other examples may differ from what is described with respect to FIG. 4.

Figure 5:
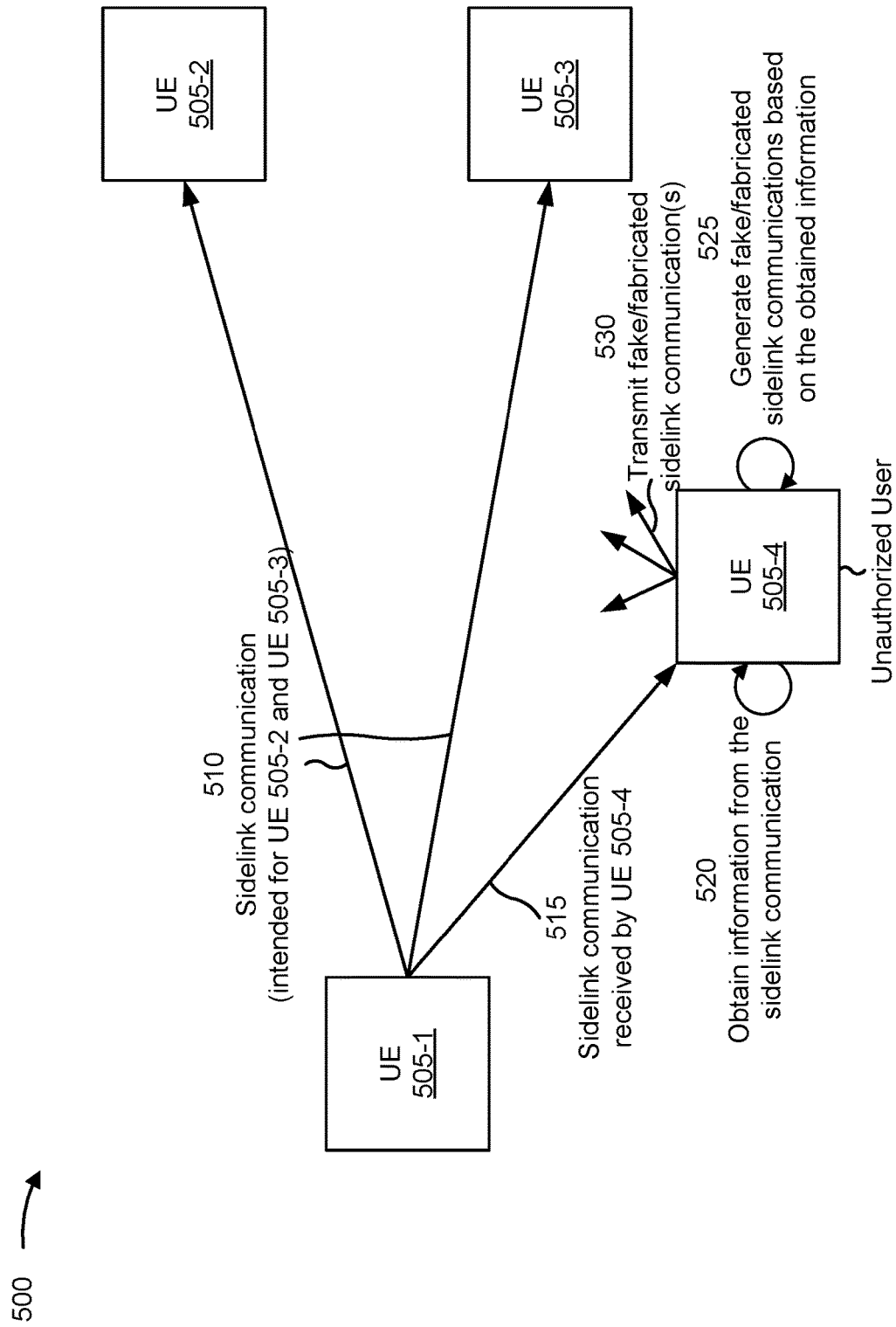
FIG. 5 is a diagram illustrating an example of security issues associated with sidelink communications, in accordance with the present disclosure.

FIG. 5 is a diagram illustrating an example 500 of security issues associated with sidelink communications, in accordance with the present disclosure. As shown in FIG. 5, a UE 505-1, a UE 505-2, and a UE 505-3 may communicate with one another via a sidelink, in a similar manner as described above in connection with FIGS. 3 and 4. A UE 505-4 may be included in the wireless network. The UE 505-4 may be an unauthorized user (e.g., an eavesdropper). For example, the UE 505-4 may not be authenticated and/or may not have permission to communicate using the sidelink. In some examples, the UE 505-4 may not be authenticated and/or registered with a base station associated with the wireless network.

In some cases, when two wireless devices communicate over a wireless channel in a wireless network, traffic that is transmitted over the wireless channel may be ciphered or otherwise encrypted using a cryptographic key. For example, security techniques are typically implemented in wireless networks using a known transmit-receive coding that relies on higher-layer encryption with a cryptographic key that is shared among the endpoint devices and used to encrypt plaintext into ciphertext and to decrypt ciphertext into plaintext. Existing security techniques focus on upper layer security, such as in an application layer of the wireless devices (e.g., because sensitive information may be contained and/or communicated via the upper layers). However, in some cases, security may be important in lower layers of the wireless devices, such as in a physical (PHY) layer of the wireless devices. For example, in some scenarios, information communicated and/or conveyed via the PHY layer may be sensitive, such as in applications where a time of arrival of a first path needs to be correctly determined.

In some cases, PHY layer security techniques may be implemented for an access link (e.g., for a direct link between a base station and a UE). For example, a channel for an access link may be secured using a radio network temporary identifier (RNTI). For example, a control channel may be secured using a cell-RNTI (C-RNTI), a paging channel may be secured using a paging-RNTI (P-RNTI), and/or a random access channel may be secured using a random access RNTI (RA-RNTI), among other examples. Communications transmitted via the channel may be scrambled or otherwise encrypted using the RNTI. The RNTI may be generated and/or established by the base station. The base station may authenticate a UE and may transmit, to the UE, an indication of the RNTI that is to be used to secure the channel. Additionally, ciphering and/or integrity security techniques may be used to secure user plane (e.g., data) communication associated with an access link between a base station and a UE.

However, the security techniques described above rely on the base stations serving as a central authority for the wireless network. For example, the base station may authenticate and/or register UEs when the UEs connect with the base station. The base station may provide security keys and/or RNTIs that are to be used to secure communications between the UE and the base station. However, sidelink networks may be distributed networks that do not use a central authority (e.g., a base station) to authenticate and/or protect communications. For example, in some cases, sidelink communications may be directly between two UEs. Moreover, in some cases, all UEs within a sidelink network may need to be enabled to receive and decode a sidelink message transmitted by a UE.

For example, as shown by reference number 510, the UE 505-1 may transmit a sidelink communication. The sidelink communicate may be an SCI message. For example, the SCI message may indicate a resource reservation for a future sidelink communication that is to be transmitted by the UE 505-1. The SCI message may be intended for the UE 505-2, the UE 505-3, and/or any other UEs operating in the sidelink network (e.g., authorized and/or authenticated UEs). Because the SCI message may indicate a resource reservation for a future sidelink communication, it is desirable that all UEs operating in the sidelink network receive the SCI message to ensure that other sidelink communications are not transmitted using the reserved resources. The SCI message may include an identifier (e.g., a transmitter identifier) of the UE 505-1. The identifier may be an identifier assigned to the UE and/or established as part of an authentication procedure for the sidelink network (e.g., such that other UEs in the sidelink network recognize the UE 505-1 as an authorized user). The sidelink communication (e.g., the SCI message) may be a broadcast message that is intended to be received by multiple UEs operating in the sidelink network.

As a result, and as shown by reference number 515, the UE 505-4 may receive the sidelink communication (e.g., the SCI message) transmitted by the UE 505-1. As described above, the UE 505-4 may be an unauthorized and/or unauthenticated user. For example, because the sidelink communication may not be protected or secured (e.g., at the PHY layer), the UE 505-4 may be enabled to receive and/or decode the sidelink communication.

As shown by reference number 520, the UE 505-4 may obtain information from the sidelink communication. For example, the UE 505-4 may obtain the identifier (e.g., the transmitter identifier) of the UE 505-1, a subchannel or frequency resources in which the UE 505-1 is transmitting (e.g., broadcasting, a future resource reservation performed by the UE 505-1, and/or other information included in, or indicated by, the sidelink communication). As shown by reference number 525, the UE 505-4 may use the information obtained from the sidelink communication to generate fake/fabricated sidelink communications. For example, the UE 505-4 may fabricate (e.g., spoof) a message such that the message appears to have been transmitted by the UE 505-1. For example, the UE 505-4 may use the identifier used by the UE 505-1, the subchannels used by the 505-1, and/or the resources indicated by a resource reservation made by the UE 505-1, among other examples, to make a fake or fabricated sidelink message appear legitimate. In other words, the UE 505-4 may generate a message copying a format, identifier, and/or resources that would be used by the UE 505-1.

As shown by reference number 530, the UE 505-4 may transmit the fake and/or fabricated message (e.g., to the UE 505-2 and/or the UE 505-3) using the identifier associated with the UE 505-1 and/or using resources reserved by the UE 505-1 (e.g., resources reserved via the sidelink communication transmitted by the UE 505-1). As a result, the UE 505-2, the UE 505-3, and/or other UEs in the sidelink network may receive the fake and/or fabricated message and may incorrectly determine that the message is legitimate.

As another example, the UE 505-4 may transmit a fake and/or fabricated feedback message to the UE 505-1. For example, the UE 505-4 may transmit the fake and/or fabricated feedback message using resources in which the UE 505-1 is expecting to receive feedback messages. For example, there may be a fixed resource mapping for feedback messages between the identifier of the UE 505-1 and the subchannel number, such that the UE 505-4 is enabled to identify the resources based on the sidelink communication transmitted by the UE 505-1.

As a result, the UE 505-4 may be enabled to cause the UE 505-4 to appear as a legitimate and/or authorized user in the sidelink network. The UE 505-4 may reserve resources within the network (e.g., preventing other UEs within the wireless network from transmitting via the sidelink), and/or may obtain sensitive information based on causing the other UEs in the sidelink network to view the UE 505-4 as a legitimate and/or authorized user in the sidelink network. Because of the lack of a central authority to verify and/or authenticate the links (e.g., the sidelinks) between the UEs in the sidelink network, it may be difficult to secure sidelink communications (e.g., at the PHY layer). For example, even if a first UE were to provide a second UE with security keys and/or a security technique, the second UE would have no way to confirm whether the first UE and/or the security keys/security technique is authentic. For example, the UE 505-4 may be enabled to fabricate a message (e.g., to cause the UE 504-4 to appear as the UE 505-1 to other UEs) with a security keys/security technique. As a result, sidelink communication may be susceptible to attacks at the PHY layer due to the information provided in sidelink communications at the PHY layer and due to the lack of a central authority to verify and/or authenticate the links (e.g., the sidelinks) between the UEs in the sidelink network.

Some techniques and apparatuses described herein enable secure sidelink communications. For example, some techniques and apparatuses described herein provide security techniques for sidelink communications at the PHY layer. For example, a UE may receive (e.g., from a base station or an RSU) an indication of information associated with one or more security keys for sidelink communications. For example, the UE may receive information to enable the UE to identify and/or generate a security key for a sidelink communication. As used herein, "security key" may refer to a security code, an encryption code, a hash function, and/or another key that can be used to scramble or encrypt information. In some aspects, the information may include a base key, one or more security keys, one or more parameters for deriving or generating the one or more security keys, a validity parameter indicating an amount of time that the information is valid, a permutation index, and/or an indication of which stages or types of SCI are to be scrambled using the one or more security keys, among other examples.

In some aspects, the one or more parameters for deriving or generating the one or more security keys may include a cell identifier and/or a location zone identifier. For example, the UE may generate a security key for an SCI message using a key generation function with a base key (e.g., that is provided by a base station or an RSU), a cell identifier and/or a location zone identifier provided as inputs to the key generation function. In this way, only UEs that have received an indication of the cell identifier and/or the location of the UE may be enabled to generate the security key to decode and/or descramble sidelink communications from the UE. For example, an unauthorized UE may not know the cell identifier and/or the location of other UEs in the sidelink network. Therefore, the unauthorized UE may be unable to decode sidelink communications that are transmitted in the sidelink network.

In some aspects, the UE may scramble SCI-1 messages and/or SCI-2 messages using the identified and/or generated security key(s). In some aspects, the UE may scramble an entire SCI-1 message. In some other aspects, the UE may scramble a portion of the SCI-1 message, such as certain fields or information contained within the SCI-1 message. In some aspects, the security keys may only be used for SCI-1 messages. The UE may generate (e.g., autonomously or without receiving information from another device) generate a security key for SCI-2 messages. The UE may transmit an SCI-1 message (e.g., that is secured and/or scrambled using a security key that provided, or indicated, by a base station or an RSU). The SCI-1 message may include an indication of the security key for SCI-2 messages. In this way, only UEs that are capable of successfully decoding the SCI-1 message may obtain the security key for SCI-2 messages.

As a result, a security of sidelink communications may be improved. For example, sidelink communications may be protected and/or secured at the PHY layer by scrambling the sidelink communications with a security key (e.g., that is provided and/or generated as described herein). This may improve a security of the network and/or may ensure that unauthorized UEs are unable to receive or decode sidelink communications (e.g., SCI) at the PHY layer.

As indicated above, FIG. 5 is provided as an example. Other examples may differ from what is described with respect to FIG. 5.

Figure 6:
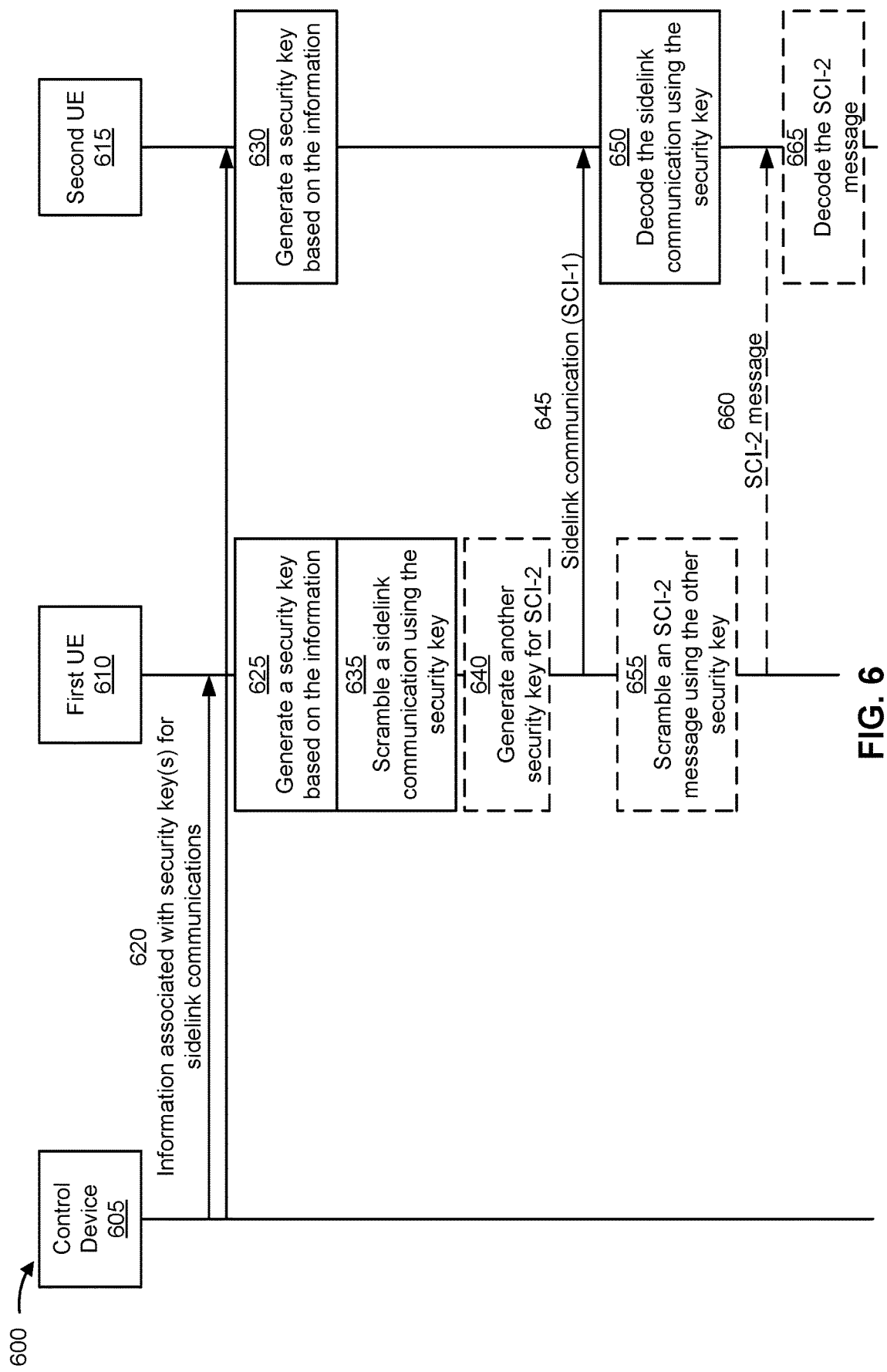
FIG. 6 is a diagram illustrating an example associated with secure sidelink communications, in accordance with the present disclosure.

FIG. 6 is a diagram illustrating an example 600 associated with secure sidelink communications, in accordance with the present disclosure. As shown in FIG. 6, a control device 605, a first UE 610, and a second UE 615 may communicate with one another in a wireless network, such as the wireless network 100. The control device 605 may be a base station 110, an RSU, or a UE 120. The first UE 610 and/or the second UE 615 may be a UE 120. The first UE 610 and the second UE 615 may communicate using a sidelink in a similar manner as described in connection with FIGS. 3-5.

As shown by reference number 620, the control device 605 may transmit, and the first UE 610 and/or the second UE 615 may receive, information associated with one or more security keys for sidelink communications. In some aspects, the control device 605 may provide the information to the first UE 610 and/or the second UE 615 based at least in part on the first UE 610 and the second UE 615 operating in the Mode 1 transmission mode (e.g., described above in more detail in connection with FIG. 3) for sidelink communications. In some aspects, the control device 605 may transmit the information associated with one or more security keys using the PDCCH. For example, the control device 605 may transmit the information associated with one or more security keys in a DCI message. In some aspects, the DCI message may use a DCI format 3_0 or 3_1, among other examples (e.g., the DCI format(s) may be defined, or otherwise fixed, by a wireless communication standard, such as the 3GPP). In some other aspects, the control device 605 may transmit the information associated with one or more security keys in an RRC message or a medium access control (MAC) control element (MAC-CE) message, among other examples. In some aspects, the control device 605 may use a combination of RRC signaling, MAC-CE signaling, and/or DCI signaling to transmit the information associated with one or more security keys. For example, the control device 605 may transmit partial information associated with one or more security keys via RRC signaling and/or MAC-CE signaling and may transmit remaining information associated with one or more security keys via DCI signaling.

In some aspects, the control device 605 may periodically or dynamically transmit information associated with the one or more security keys. For example, the control device 605 may update the one or more security keys and/or may update parameters to be used (e.g., by a UE) to derive the one or more security keys. The control device 605 may transmit, to the first UE 610 and/or the second UE 615, information associated with the one or more security keys periodically and/or based at least in part on updating the one or more security keys and/or updating parameters to be used to derive the one or more security keys.

In some aspects, the information associated with one or more security keys may include a base key. A base key may be a security key that is used for deriving other security keys. For example, the first UE 610 and/or the second UE 615 may use the base key to derive other security keys that are to be used to secure sidelink communications, as described in more detail elsewhere herein. The base key may be an Advanced Encryption Standard (AES) key. For example, the base key may be an AES-128 key (e.g., that uses a 128-bit key length) or an AES-192 key (e.g., that uses a 192-bit key length), among other examples. The base key may be used as an input to a key generation function to generate or derive a security key (e.g., an output of the key generation function) to be used to secure sidelink communications (for example, by the first UE 610 and/or the second UE 615). The key generation function may be a hash function, an encryption function, a key derivation function, and/or another cryptographic function that derives the one or more security keys.

In some aspects, the information associated with one or more security keys may include the one or more security keys. For example, rather than the first UE 610 and/or the second UE 615 generating or deriving the one or more security keys (e.g., using the base key, one or more parameters, and/or the key generation function, as described in more detail elsewhere herein), the control device 605 may transmit an indication of the one or more security keys to be used by the first UE 610 and/or the second UE 615 to secure sidelink communications at the PHY layer. A security key may be an AES key. For example, a security key may be an AES-128 key, an AES-192 key, or an AES-256 key (e.g., that uses a 256-bit length), among other examples. In some aspects, the control device 605 may transmit an indication of a first security key and a second security key. The first security key may be associated with SCI-1 and the second security key may be associated with SCI-2. For example, the first security key may be associated with encrypting, scrambling, or otherwise securing SCI-1 messages (e.g., PSCCH messages). The second security key may be associated with encrypting, scrambling, or otherwise securing SCI-2 messages (e.g., PSSCH messages). In some other aspects, the control device 605 may transmit an indication of a single security key that is to be used to secure SCI-1 messages, SCI-2 messages, and/or other sidelink messages transmitted by the first UE 610 or the second UE 615. In some other aspects, the control device 605 may transmit an indication of a single security key that is to be used to secure SCI-1 messages (e.g., and not SCI-2 messages and/or other sidelink messages).

In some other aspects, one or more (or all) of the security keys may be preconfigured on the first UE 610 and/or the second UE 615 (e.g., in an original equipment manufacturer (OEM) configuration). In such examples, the control device 605 may not transmit information associated with the security key(s) that are preconfigured on the first UE 610 and/or the second UE 615. In some aspects, a first security key may be preconfigured on a UE and a second security key may be indicated or configured by the control device 605 (e.g., in a similar manner as described elsewhere herein). In some aspects, the first UE 610 and/or the second UE 615 may use a preconfigured security key based at least in part on operating in the Mode 2 transmission mode. If the first UE 610 and/or the second UE 615 are operating in the Mode 1 transmission mode, then the first UE 610 and/or the second UE 615 may use security key(s) indicated or provided by the control device 605.

In some aspects, the information associated with one or more security keys may include a validity parameter indicating an amount of time that the information is valid. For example, the validity parameter may indicate a time of validity for a security key indicated by the information or derived based at least in part on the information. The validity parameter may indicate a number of slots (e.g., measured from a slot in which the information is transmitted or received) during which the information associated with one or more security keys is valid. After the amount of time indicated by the validity parameter (e.g., after the number of slots), the first UE 610 and/or the second UE 615 may refrain from using security keys indicated by the information and/or may refrain from generating or deriving security keys based at least in part on the information. This may ensure that the security key(s) used to secure sidelink communications are not used for an unlimited amount of time, thereby reducing the likelihood that an unauthorized UE is able to obtain the security key(s).

In some aspects, the information associated with one or more security keys may include one or more parameters for deriving the one or more security keys. For example, the control device 605 may transmit an indication of the one or more parameters to the first UE 610 and/or the second UE 615. The first UE 610 and/or the second UE 615 may use the one or more parameters to generate or derive the one or more security keys. For example, the first UE 610 and/or the second UE 615 may use the values of the one or more parameters as inputs to the key generation function (e.g., in addition to the base key) to generate or derive the one or more security keys. In some aspects, the one or more parameters may include a first one or more parameters for deriving a first security key (e.g., associated with SCI-1) and a second one or more parameters for deriving a second security key (e.g., associated with SCI-2). The one or more parameters may include a cell identifier (e.g., a cell ID), a UE location identifier (e.g., a location zone identifier, a zone identifier, and/or a location identifier), and/or a UE identifier, among other examples.

In some aspects, the information may indicate a parameter to be used to derive a security key and a UE may use a value associated with the parameter, that is stored by the UE, to derive the security key. For example, the information may indicate that a cell identifier is to be used to derive a security key, but the information may not actually indicate the cell identifier. Rather, a UE (e.g., the first UE 610 and/or the second UE 615) may obtain the value for the cell identifier (e.g., that is stored by the UE) and may use the value as an input to the key generation function to derive or generate the security key. In this way, security may be improved because only UEs that have previously, received or been configured with, values for the parameter(s) may correctly derive or generate the security key(s).

In some aspects, the information associated with one or more security keys may include an indication of the key generation function to be used by the first UE 610 and/or the second UE 615 to generate or derive a security key. For example, the first UE 610 and/or the second UE 615 may receive configuration information (e.g., RRC configuration information) indicating the key generation function. In some other aspects, the key generation function may be preconfigured on the first UE 610 and/or the second UE 615. For example, the key generation function may be configured as part of an OEM configuration. In other words, in some aspects, the key generation function may be hardcoded on the first UE 610 and/or the second UE 615. In some aspects, the key generation function may be RRC configured or hardcoded on the first UE 610 and/or the second UE 615 and the control device 605 may dynamically update values for parameters associated with the key generation function (e.g., via DCI signaling or MAC-CE signaling). For example, the control device 605 may dynamically update (e.g., in the information associated with one or more security keys and/or in another message) values to be used as inputs to the key generation function. The control device 605 may transmit, and the first UE 610 and/or the second UE 615 may receive, a dynamic message indicating values for the one or more parameters to be used with the key generation function to derive the one or more security keys. In this way, security may be improved because an unauthorized user may be unable to reuse old values as inputs to the key generation function to generate the one or more security keys. In other words, even if an unauthorized UE has access to the key generation function, because the values of parameters associated with the key generation function are dynamically updated, the unauthorized UE may be unable to correctly generate security keys for the sidelink network.

In some aspects, the information associated with one or more security keys may include a permutation index to be used to permutate information (e.g., a payload) associated with a sidelink communication. For example, the permutation index may be used map or permutate information (e.g., bits) to be transmitted in the sidelink communication. In some aspects, the information associated with one or more security keys may include an indication of which stages or types of SCI are to be scrambled using the one or more security keys. For example, the information associated with one or more security keys may indicate that SCI-1 and/or SCI-2 are to be scrambled or encoded using the one or more security keys. For example, the information associated with one or more security keys may indicate whether one or both types of SCI, from SCI-1 messages and SCI-2 messages, need to be secured using the one or more security keys. In some aspects, the control device 605 may indicate that only SCI-1 messages are to be secured or scrambled using the one or more security keys (e.g., and not SCI-2 messages). In some other aspects, the control device 605 may indicate that both SCI-1 and SCI-2 messages are to be secured or scrambled using the one or more security keys. In some other aspects, the control device 605 may indicate that only SCI-1 messages are to be secured or scrambled using the one or more security keys provided by the control device 605 and that UEs are to secure SCI-2 message using a security key generated or determined by the UE (e.g., autonomously without any input from another device).

As shown by reference number 625, the first UE 610 may generate a security key based at least in part on the information provided by the control device 605 (e.g., as described in connection with reference number 620) and/or based at least in part on information stored by the first UE 610. In some aspects, the first UE 610 may identify a security key based at least in part on the information provided by the control device 605 (e.g., in examples where the control device 605 provides the security key to be used by the first UE 610). In some other aspects, the first UE 610 may generate or derive the security key based at least in part on the information provided by the control device 605 and/or based at least in part on information stored by the first UE 610. For example, the first UE 610 may use the key generation function to generate or derive the security key. In some aspects, the first UE 610 may generate or derive the security key based at least in part on the base key and/or one or more parameters indicated by the control device 605. For example, the first UE 610 may generate or derive the security key as K=KGF (K$_B$,param1,param2, . . . ), where K is the security key, KGF is the key generation function, K$_B$ is the base key, param1 is a first parameter, and param2 is a second parameter. For example, where the one or more parameters include a cell identifier and a location or zone identifier of the first UE 610 and the first UE 610 is located in a location zone 1, the first UE 610 may generate or derive the security key as K=KGF(K$_B$, cell ID, Zone1), where cell ID is the cell identifier associated with the first UE 610 and/or the control device 605, and where Zone2 is the location zone identifier of the first UE 610 (e.g., indicating that the first UE 610 is physically located in the location zone 1). Similarly, if the first UE 610 is located in a location zone 2, then the first UE 610 may generate or derive the security key as K=KGF(K$_B$, cell ID, Zone2). In some aspects, the location zones may be configured and/or indicated by the control device 605.

Security associated with the sidelink communications may be improved by using a cell identifier and/or a location zone identifier associated with the first UE 610 to generate or derive the security key. For example, an unauthorized UE may be enabled to intercept a sidelink communication and may be able to obtain some information from the sidelink communication, such as a UE identifier. However, the unauthorized UE may be unable to determine a location of the UE that transmitted the sidelink communication and/or a cell identifier associated with the UE because that information is not indicated in the sidelink communication (e.g., at the PHY layer). Therefore, the unauthorized UE may be unable to identify the correct parameter(s) to use to generate the security key used by the first UE 610, thereby improving the security of the sidelink communications that are scrambled or encoded using the security key.

As described above, the information provided by the control device 605 may indicate one or more parameters to be used as inputs to the key generation function. The first UE 610 may identify values associated with the one or more parameters based at least in part on information stored by the first UE 610. For example, the control device 605 may indicate that a location zone identifier parameter is to be used as an input to the key generation function. To generate the security key, the first UE 610 may determine a location of the first UE 610 (e.g., to identify a location zone that the first UE 610 is currently located in). The first UE 610 may identify a value or an input associated with the location zone identifier parameter. The first UE 610 may use the value or the input associated with the location zone identifier parameter as an input to the key generation function to generate or derive the security key.

In some aspects, the first UE 610 may use information (e.g., associated with the one or more security keys) to generate or derive a security key that is transmitted (e.g., by the control device 605) in a most recently received message associated with providing information for the one or more security key. For example, the control device 605 may periodically and/or dynamically transmit information associated with the one or more security keys (e.g., as described above). Different messages may include different values for parameters, different parameters, and/or different information to be used by the first UE 610 to generate or derive the security key. The first UE 610 may use information (e.g., values for parameters, parameters, and/or information to be used to generate or derive the security key) based at least in part on the information being included in the most recently received DCI message. For example, the DCI message may be a latest, or most recently, received DCI message that uses a DCI format 3_0 or 3_1. In other words, the first UE 610 may use the most recently indicated information to generate the security key.

In some aspects, the first UE 610 may use the information to generate the security key based at least in part on a validity parameter (e.g., included in the information) indicating that the information is valid (e.g., at a time when the security key is generated and/or at a time when the sidelink communication is to be transmitted). For example, the first UE 610 may determine an amount of time from receiving the message that indicated the information to a time when the sidelink communication is to be transmitted (e.g., in a quantity of slots). The first UE 610 may determine whether the amount of time satisfies (e.g., is less than) an amount of time during which that the information is valid (e.g., as indicated by the validity parameter). For example, the validity parameter may indicate that the information is valid for L slots. The first UE 610 may determine whether the amount of time from receiving the message that indicated the information to a time when the sidelink communication is to be transmitted is less than or equal to L slots. If the amount of time is less than or equal to L slots, then the first UE 610 may use the information to generate or derive the security key. If the amount of time is greater than L slots, then the first UE 610 may not use the information to generate or derive the security key.

As described in more detail elsewhere herein, the information, parameter(s), and/or value(s) used by the first UE 610 to generate or derive the security key may be indicated by the control device 605 and/or may be preconfigured or hardcoded on the first UE 610. For example, in examples where the first UE 610 is operating in the Mode 2 transmission mode, some (or all) of the information used by the first UE 610 to generate or derive the security key may be preconfigured or hardcoded on the first UE 610. In some aspects, when the first UE 610 is operating in the Mode 2 transmission mode, some (or all) of the information used by the first UE 610 to generate or derive the security key may be transmitted by an RSU (e.g., rather than a base station 110).

In some aspects, as shown by reference number 630, the second UE 615 may generate or derive the security key to be used for sidelink communications between the second UE 615 and the first UE 610. The second UE 615 may generate or derive the security key in a similar (or the same) manner as described above in connection with the first UE 610 generating the security key.

As shown by reference number 635, the first UE 610 may scramble a sidelink communication (e.g., to be transmitted to the second UE 615 and/or other UEs) using the security key. In other words, the first UE 610 may scramble, encrypt, encode, or otherwise secure information included in the sidelink communication using the security key. The sidelink communication may be an SCI-1 communication (e.g., a PSCCH communication), an SCI-2 communication (e.g., a PSSCH communication), or another type of sidelink communication.

For example, the first UE 610 may generate a scrambling sequence using the security key. The first UE 610 may scramble or encode the sidelink communication using the scrambling sequence. For example, the first UE 610 may scramble or encode information (e.g., bits) to be included in the sidelink communication using the scrambling sequence. In some aspects, the first UE 610 may scramble all information included in the sidelink communication using the scrambling sequence. For example, the first UE 610 may scramble information for all fields of the sidelink communication (e.g., for an SCI-1 or SCI-2 message). In other words, the first UE 610 may use the scrambling sequence to scramble an SCI-1 message and/or an SCI-2 message completely.

In some other aspects, the first UE 610 may scramble only a portion of the information included in the sidelink communication using the scrambling sequence. For example, the first UE 610 may scramble information included in a subset of fields, of a set of fields associated with the sidelink communication, using the scrambling sequence. For example, SCI may be associated with the set of fields to be used to indicate different information. For example, SCI-1 may include one or more resources (e.g., time resources, frequency resources, and/or spatial resources) reservation fields, a field associated with information for decoding sidelink communications on the PSSCH, a QoS priority value field, a resource reservation period field, a PSSCH DMRS pattern field, an SCI format for the SCI-2 field, a beta offset for the SCI-2 field, a field for indicating a quantity of PSSCH DMRS ports, and/or an MCS field, among other examples. The SCI-2 may include one or more fields for indicating information associated with data transmissions on the PSSCH, such as a HARQ process ID field, an NDI field, a source identifier field, a destination identifier field, and/or a CSI report trigger field, among other examples.

The first UE 610 may scramble a subset of fields, associated with an SCI message, using the scrambling sequence. Other fields associated with the SCI message may not be scrambled or encrypted. For example, the first UE 610 may scramble fields of an SCI message that are associated with critical or sensitive information. In some aspects, the subset of fields scrambled by the first UE 610 may include a frequency resource assignment field, a resource reservation period field, and/or an MCS field, among other examples. This may enable the first UE 610 to ensure that critical or sensitive information included in the sidelink communication is secured or encrypted while also reducing an overhead (e.g., a processing overhead) associated with securing the sidelink communication.

Additionally, the first UE 610 may permute an output sequence (e.g., after scrambling information to be included in the sidelink communication) based at least in part on the permutation index. The output sequence may be a sequence that is generated based at least in part on scrambling the information (e.g., using the scrambling sequence) as described elsewhere herein. For example, the first UE 610 may perform a permutation of the scrambled information to be included in the sidelink communication. The permutation of the scrambled information is depicted and described in more detail in connection with FIG. 7.

In some aspects, as shown by reference number 640, the first UE 610 may generate a security key associated with SCI-2 messages. For example, the security key and/or the sidelink communication described above (e.g., in connection with reference number 635) may be associated with SCI-1. In other words, only security keys (and/or information associated with generating or deriving security keys) associated with SCI-1 may be indicated by the control device 605 and/or preconfigured or hardcoded on the first UE 610. Security keys for SCI-2 may be autonomously generated and/or derived by the first UE 610. "Autonomously" generated or derived may refer to a UE generating or deriving a security key without using information provided by another device, such as the control device 605. For example, the first UE 610 may generate a different security key (e.g., different than the security key used to scramble or encode the sidelink communication, such as the SCI-1 communication, described above) that is associated with SCI-2. The first UE 610 may include an indication of the different security key in the sidelink communication. For example, the first UE 610 may include an indication of the different security key (e.g., the security key associated with SCI-2) in a payload of the SCI-1 message that is scrambled using the security key, as described above. This may enable the second UE 615 to receive and identify the different security key (e.g., the security key associated with SCI-2) after decoding the sidelink communication (e.g., the SCI-1) using the security key. This may improve a security associated with SCI-2 messages because only UEs that are able to successfully decode the SCI-1 message may receive the indication of the security key used to secure SCI-2 messages.

As shown by reference number 645, the first UE 610 may transmit, and the second UE 615 and/or other UEs may receive, the sidelink communication that is scrambled and/or encoded using the security key. As described elsewhere herein, the sidelink communication may be an SCI-1 message, and SCI-2 message, and/or another type of sidelink message. In some aspects, the first UE 610 may transmit the sidelink message that is scrambled using the security based at least in part on the validity parameter associated with the security key indicating that the security key is valid (e.g., at a time when the sidelink communication is transmitted). In some aspects, such as when the sidelink communication is an SCI-1 message, the first UE 610 may transmit the sidelink communication including a security key that is associated with SCI-2 messages. For example, the first UE 610 may transmit the sidelink communication that is scrambled using the security key, where the sidelink communication indicates the different security key associated with SCI-2 messages.

As shown by reference number 650, the second UE 615 may receive the sidelink communication that is scrambled using the security key. The second UE 615 may decode the sidelink communication using the security key (e.g., that is identified or generated by the second UE 615 as described in more detail elsewhere herein). For example, the second UE 615 may descramble or decrypt information included in the sidelink communication using the security key. The second UE 615 may obtain the information (e.g., a payload) of the sidelink communication based at least in part on decoding the sidelink communication.

In some aspects, the second UE 615 may decode, descramble, and/or decrypt fields of the sidelink communication that have been scrambled by the first UE 610. For example, as described elsewhere herein, the first UE 610 may scramble all or a subset of fields associated with the sidelink communication. Therefore, in some aspects, the second UE 615 may not need to decode, descramble, and/or decrypt all fields of the sidelink communication, thereby reducing an overhead (e.g., a processing overhead) associated with decoding the sidelink communication.

In some aspects, based at least in part on decoding the sidelink communication, the second UE 615 may obtain a security key associated with other sidelink communications, such as SCI-2 messages. For example, the security key associated with other sidelink communications may be included in a payload of the sidelink communication. Therefore, based at least in part on successfully decoding the sidelink communication (e.g., using the security key), the second UE 615 may obtain one or more different security keys that may be used to secure other sidelink communications, such as SCI-2 messages.

In some aspects, as shown by reference number 655, the first UE 610 may scramble an SCI-2 message using the security key generated by the first UE 610 (e.g., as described in connection with reference number 640). For example, the first UE 610 may scramble information to be included in an SCI-2 message using the security key that is autonomously generated or derived by the first UE 610. The first UE 610 may fully or partially scramble the SCI-2 message using the security key that is autonomously generated or derived by the first UE 610 in a similar manner as described in more detail elsewhere herein.

As shown by reference number 660, the first UE 610 may transmit, and the second UE 615 and/or other UEs may receive, the SCI-2 message that is scrambled message using the security key that is autonomously generated or derived by the first UE 610. As described above, the second UE 615 may obtain or identify the security key associated with the SCI-2 message based at least in part on successfully decoding the first sidelink communication (e.g., the SCI-1 message) transmitted by the first UE 610 (e.g., as described in connection with reference numbers 645 and 650). Therefore, as shown by reference number 665, the second UE 615 may decode the SCI-2 message using the security key that is autonomously generated or derived by the first UE 610 and/or the security key that is included in the first sidelink communication (e.g., the SCI-1 message) transmitted by the first UE 610. In other words, the second UE 615 may be enabled to decode the SCI-2 message based at least in part on a security key used to scramble the SCI-2 message being included in a payload of a SCI-1 message (e.g., that is scrambled or secured in a similar manner as described in more detail elsewhere herein). The second UE 615 may decode the SCI-2 message in a similar manner as described above.

As a result, a security of sidelink communications may be improved. For example, sidelink communications may be protected and/or secured at the PHY layer by scrambling the sidelink communications with a security key (e.g., that is provided and/or generated as described herein). This may improve a security of the network and/or may ensure that unauthorized UEs are unable to receive or decode sidelink communications (e.g., SCI) at the PHY layer.

As indicated above, FIG. 6 is provided as an example. Other examples may differ from what is described with respect to FIG. 6.

Figure 7:
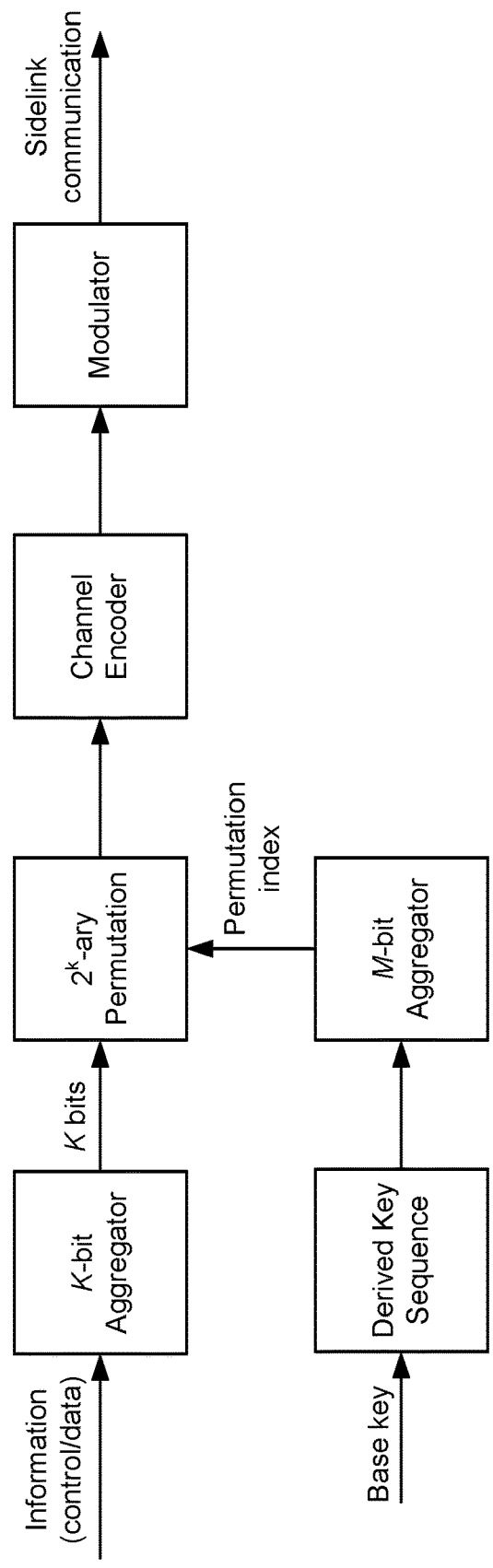
FIG. 7 is a diagram illustrating an example associated with securing a sidelink communication using a security key, in accordance with the present disclosure.

FIG. 7 is a diagram illustrating an example 700 associated with securing a sidelink communication using a security key, in accordance with the present disclosure. Example 700 depicts an example of operations performed by a UE 120 (e.g., the first UE 610 and/or the second UE 615) associated with scrambling and/or permuting information that is included in a sidelink communication.

For example, a base key may be used to generate or derive a security key (e.g., using a key generation function and/or one or more parameters, as described in more detail elsewhere herein). The security key may be used to generate or derive a scrambling sequence. The scrambling sequence may have a size or length of n bits. The scrambling sequence of n bits may be generated by concatenating or pruning a security key (e.g., an AES security key) of t bits. For example, when n is greater than or equal to t, one or more instances or copies of the security key may be concatenated. If n is less than t, then one instance or copy of the security key may be used to generate the scrambling sequence. The scrambling sequence of length n bits may be aggregated into groups of M bits (e.g., in the M-bit aggregator). The UE 120 may determine the permutation index based at least in part on aggregating the scrambling sequence.

Information (e.g., control information and/or data information) associated with a sidelink communication may be aggregated into K bits (e.g., in the K-bit aggregator). The UE 120 may perform a permutation of the K bits based at least in part on the permutation index. For example, an input K-ary bits may be permuted by the UE 120 based at least in part on the permutation index. For example, the K-ary bits may be mapped or permuted by the UE 120 (e.g., the original or input K-ary bits may be associated with a value of $m_1$ and the UE 120 may map the K-ary bits to another value of $m_2$, where $m_1$ and $m_2$ are different). The mapped K-ary bits may be channel encoded (e.g., by a channel encoder). The encoded bits may be modulated (e.g., by a modulator). For example, quadrature phase shift keying (QPSK) modulation or quadrature amplitude modulation (QAM) modulation may be performed by the UE 120. The UE 120 may transmit the encoded and modulated bits. In this way, the information included in the sidelink communication may be scrambled, permuted, and/or otherwise secured at the PHY layer.

As indicated above, FIG. 7 is provided as an example. Other examples may differ from what is described with respect to FIG. 7.

Figure 8:
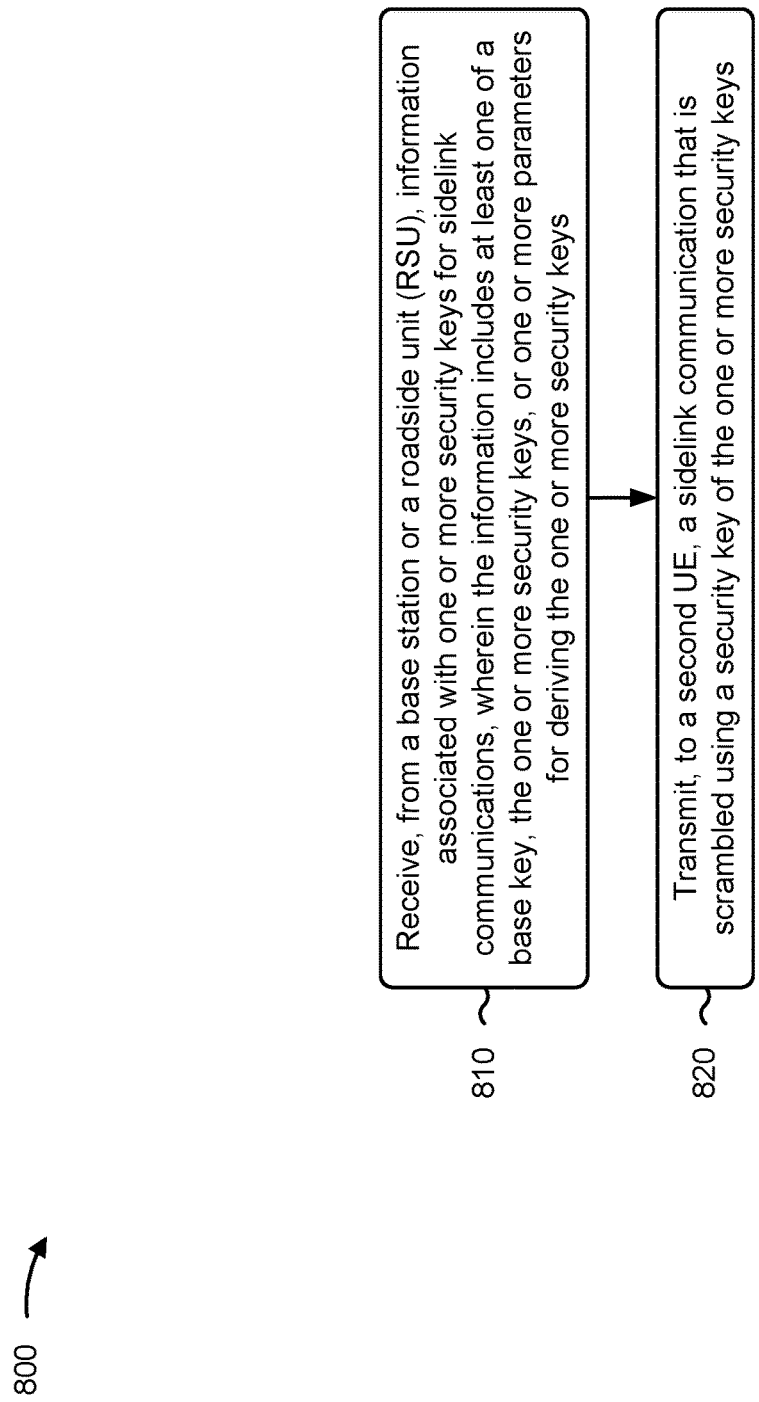
FIGS. 8 and 9 are diagrams illustrating example processes associated with secure sidelink communications, in accordance with the present disclosure.

FIG. 8 is a diagram illustrating an example process 800 performed, for example, by a UE, in accordance with the present disclosure. Example process 800 is an example where a first UE (e.g., a UE 120 and/or the first UE 610) performs operations associated with secure sidelink communications.

As shown in FIG. 8, in some aspects, process 800 may include receiving, from a base station or an RSU, information associated with one or more security keys for sidelink communications, wherein the information includes at least one of a base key, the one or more security keys, or one or more parameters for deriving the one or more security keys (block 810). For example, the first UE (e.g., using communication manager 140 and/or reception component 1002, depicted in FIG. 10) may receive, from a base station or an RSU, information associated with one or more security keys for sidelink communications, wherein the information includes at least one of a base key, the one or more security keys, or one or more parameters for deriving the one or more security keys, as described above.

As further shown in FIG. 8, in some aspects, process 800 may include transmitting, to a second UE, a sidelink communication that is scrambled using a security key of the one or more security keys (block 820). For example, the first UE (e.g., using communication manager 140 and/or transmission component 1004, depicted in FIG. 10) may transmit, to a second UE, a sidelink communication that is scrambled using a security key of the one or more security keys, as described above.

Process 800 may include additional aspects, such as any single aspect or any combination of aspects described below and/or in connection with one or more other processes described elsewhere herein.

In a first aspect, receiving the information associated with the one or more security keys includes receiving an indication of at least one of a validity parameter indicating an amount of time that the information is valid, a permutation index, or an indication of which stages or types of SCI are to be scrambled using the one or more security keys.

In a second aspect, alone or in combination with the first aspect, receiving the information associated with the one or more security keys includes receiving the information via at least one of a downlink control information message, a radio resource control message, or a medium access control message.

In a third aspect, alone or in combination with one or more of the first and second aspects, the one or more security keys include a first security key associated with an SCI-1 and a second security key associated with an SCI-2.

In a fourth aspect, alone or in combination with one or more of the first through third aspects, process 800 includes generating, using a key generation function, the security key based at least in part on the one or more parameters and the base key.

In a fifth aspect, alone or in combination with one or more of the first through fourth aspects, the key generation function is preconfigured on the first UE.

In a sixth aspect, alone or in combination with one or more of the first through fifth aspects, process 800 includes receiving, from the base station or the RSU, configuration information indicating the key generation function.

In a seventh aspect, alone or in combination with one or more of the first through sixth aspects, the key generation function is preconfigured on the first UE or indicated via configuration information, the method further comprising receiving, from the base station or the RSU, a dynamic message indicating values for the one or more parameters to be used with the key generation function to derive the one or more security keys.

In an eighth aspect, alone or in combination with one or more of the first through seventh aspects, the one or more parameters include at least one of a cell identifier or a location zone identifier.

In a ninth aspect, alone or in combination with one or more of the first through eighth aspects, process 800 includes generating a scrambling sequence using the security key, and scrambling the sidelink communication using the scrambling sequence.

In a tenth aspect, alone or in combination with one or more of the first through ninth aspects, scrambling the sidelink communication includes scrambling all information included in the sidelink communication using the scrambling sequence.

In an eleventh aspect, alone or in combination with one or more of the first through tenth aspects, the sidelink communication includes a set of fields, and wherein scrambling the sidelink communication includes scrambling information included in a subset of fields, of the set of fields, using the scrambling sequence.

In a twelfth aspect, alone or in combination with one or more of the first through eleventh aspects, the subset of fields includes at least one of a frequency resource assignment field, a resource reservation period field, or a modulation and coding scheme field.

In a thirteenth aspect, alone or in combination with one or more of the first through twelfth aspects, the information is associated with the security key, and wherein the security key is associated with an SCI-1.

In a fourteenth aspect, alone or in combination with one or more of the first through thirteenth aspects, the sidelink communication is an SCI-1 communication, and wherein transmitting the sidelink communication includes generating a different security key that is associated with an SCI-2, and transmitting, to the second UE, the sidelink communication that is scrambled using the security key, wherein the sidelink communication indicates the different security key.

In a fifteenth aspect, alone or in combination with one or more of the first through fourteenth aspects, process 800 includes transmitting, to the second UE, an SCI-2 communication that is scrambled using the different security key.

In a sixteenth aspect, alone or in combination with one or more of the first through fifteenth aspects, the information is included in a most recently received downlink control information message, and wherein transmitting the sidelink communication includes transmitting the sidelink communication that is scrambled using the security key, wherein the security key is generated using the information based at least in part on the information being included in the most recently received downlink control information message.

In a seventeenth aspect, alone or in combination with one or more of the first through sixteenth aspects, the information includes a validity parameter indicating an amount of time that the information is valid, and wherein transmitting the sidelink communication includes transmitting the sidelink communication that is scrambled using the security key, wherein the security key is generated using the information based at least in part on the validity parameter indicating that the information is valid at a time when the sidelink communication is transmitted.

In an eighteenth aspect, alone or in combination with one or more of the first through seventeenth aspects, the sidelink communication is a sidelink control information message or a sidelink data message.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
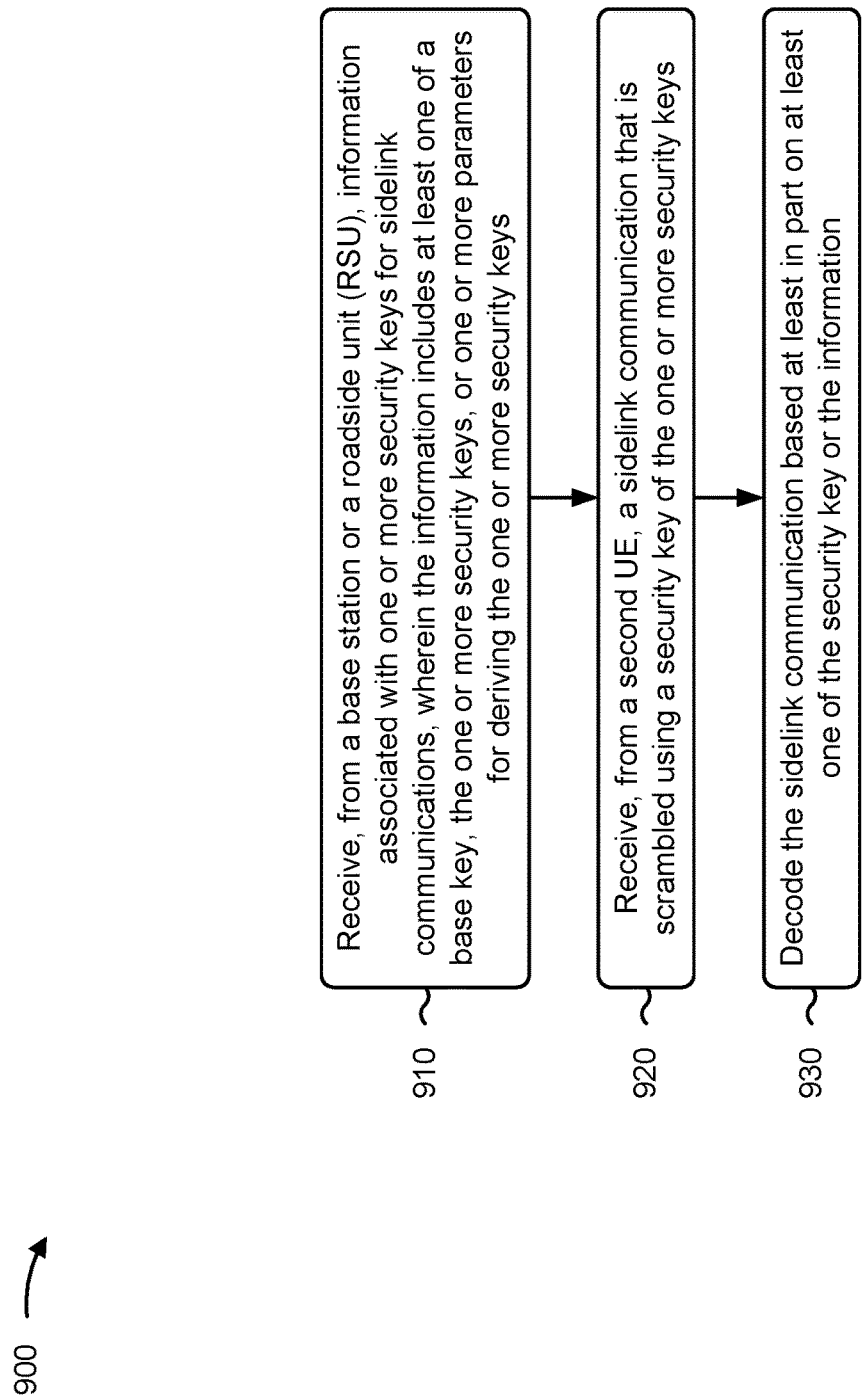

FIG. 9 is a diagram illustrating an example process 900 performed, for example, by a UE, in accordance with the present disclosure. Example process 900 is an example where a first UE (e.g., a UE 120 and/or the second UE 615) performs operations associated with secure sidelink communications.

As shown in FIG. 9, in some aspects, process 900 may include receiving, from a base station or an RSU, information associated with one or more security keys for sidelink communications, wherein the information includes at least one of a base key, the one or more security keys, or one or more parameters for deriving the one or more security keys (block 910). For example, the first UE (e.g., using communication manager 140 and/or reception component 1102, depicted in FIG. 11) may receive, from a base station or an RSU, information associated with one or more security keys for sidelink communications, wherein the information includes at least one of a base key, the one or more security keys, or one or more parameters for deriving the one or more security keys, as described above.

As further shown in FIG. 9, in some aspects, process 900 may include receiving, from a second UE, a sidelink communication that is scrambled using a security key of the one or more security keys (block 920). For example, the first UE (e.g., using communication manager 140 and/or reception component 1102, depicted in FIG. 11) may receive, from a second UE, a sidelink communication that is scrambled using a security key of the one or more security keys, as described above.

As further shown in FIG. 9, in some aspects, process 900 may include decoding the sidelink communication based at least in part on at least one of the security key or the information (block 930). For example, the first UE (e.g., using communication manager 140 and/or decoding component 1108, depicted in FIG. 11) may decode the sidelink communication based at least in part on at least one of the security key or the information, as described above.

Process 900 may include additional aspects, such as any single aspect or any combination of aspects described below and/or in connection with one or more other processes described elsewhere herein.

In a first aspect, receiving the information associated with the one or more security keys includes receiving an indication of at least one of a validity parameter indicating an amount of time that the information is valid, a permutation index, or an indication of what stages or types of SCI are to be scrambled using the one or more security keys.

In a second aspect, alone or in combination with the first aspect, receiving the information associated with the one or more security keys includes receiving the information via at least one of a downlink control information message, a radio resource control message, or a medium access control message.

In a third aspect, alone or in combination with one or more of the first and second aspects, the one or more security keys include a first security key associated with an SCI-1 and a second security key associated with an SCI-2.

In a fourth aspect, alone or in combination with one or more of the first through third aspects, process 900 includes generating, using a key generation function, the security key based at least in part on the one or more parameters and the base key.

In a fifth aspect, alone or in combination with one or more of the first through fourth aspects, the key generation function is preconfigured on the first UE.

In a sixth aspect, alone or in combination with one or more of the first through fifth aspects, process 900 includes receiving, from the base station or the RSU, configuration information indicating the key generation function.

In a seventh aspect, alone or in combination with one or more of the first through sixth aspects, the key generation function is preconfigured on the first UE or indicated via configuration information, the method further comprising receiving, from the base station or the RSU, a dynamic message indicating values for the one or more parameters to be used with the key generation function to derive the one or more security keys.

In an eighth aspect, alone or in combination with one or more of the first through seventh aspects, the one or more parameters include at least one of a cell identifier or a location zone identifier.

In a ninth aspect, alone or in combination with one or more of the first through eighth aspects, process 900 includes generating a scrambling sequence using the security key, and wherein decoding the sidelink communication includes decoding the sidelink communication using the scrambling sequence.

In a tenth aspect, alone or in combination with one or more of the first through ninth aspects, decoding the sidelink communication includes decoding all information included in the sidelink communication using the security key.

In an eleventh aspect, alone or in combination with one or more of the first through tenth aspects, the sidelink communication includes a set of fields, and wherein decoding the sidelink communication includes decoding information included in a subset of fields, of the set of fields, using the security key.

In a twelfth aspect, alone or in combination with one or more of the first through eleventh aspects, the subset of fields includes at least one of a frequency resource assignment field, a resource reservation period field, or a modulation and coding scheme field.

In a thirteenth aspect, alone or in combination with one or more of the first through twelfth aspects, the information is associated with the security key, and wherein the security key is associated with an SCI-1.

In a fourteenth aspect, alone or in combination with one or more of the first through thirteenth aspects, the sidelink communication is an SCI-1 communication, and wherein receiving the sidelink communication includes receiving, from the second UE, the sidelink communication that is scrambled using the security key, wherein the sidelink communication indicates a different security key that is generated by the second UE for SCI-2, and wherein decoding the sidelink communication includes decoding the sidelink communication using the security key to obtain the different security key.

In a fifteenth aspect, alone or in combination with one or more of the first through fourteenth aspects, process 900 includes receiving, from the second UE, an SCI-2 communication that is scrambled using the different security key, and decoding the SCI-2 communication using the different security key.

In a sixteenth aspect, alone or in combination with one or more of the first through fifteenth aspects, the information is included in a most recently received downlink control information message, and wherein decoding the sidelink communication includes decoding the sidelink communication using the security key, wherein the security key is generated using the information based at least in part on the information being included in the most recently received downlink control information message.

In a seventeenth aspect, alone or in combination with one or more of the first through sixteenth aspects, the information includes a validity parameter indicating an amount of time that the information is valid, and wherein decoding the sidelink communication includes decoding the sidelink communication using the security key, wherein the security key is generated using the information based at least in part on the validity parameter indicating that the information is valid at a time when the sidelink communication is transmitted.

In an eighteenth aspect, alone or in combination with one or more of the first through seventeenth aspects, the sidelink communication is a sidelink control information message or a sidelink data message.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
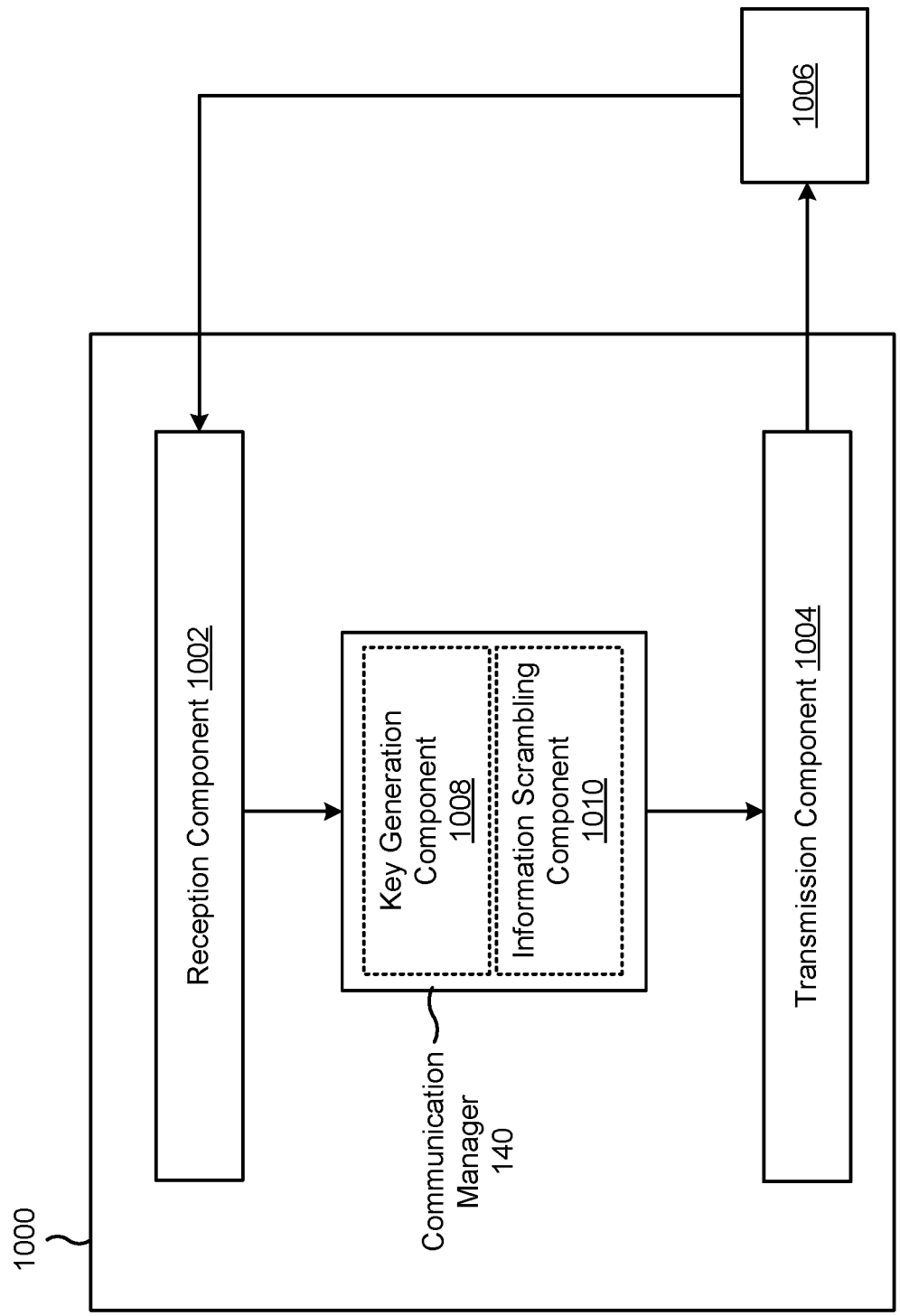
FIGS. 10 and 11 are diagrams of example apparatuses for wireless communication, in accordance with the present disclosure.

FIG. 10 is a diagram of an example apparatus 1000 for wireless communication. The apparatus 1000 may be a UE, or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 140. The communication manager 140 may include one or more of a key generation component 1008, and/or an information scrambling component 1010, among other examples.

In some aspects, the apparatus 1000 may be configured to perform one or more operations described herein in connection with FIGS. 6 and 7. Additionally, or alternatively, the apparatus 1000 may be configured to perform one or more processes described herein, such as process 800 of FIG. 8, or a combination thereof. In some aspects, the apparatus 1000 and/or one or more components shown in FIG. 10 may include one or more components of the UE described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the UE described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the UE described in connection with FIG. 2. In some aspects, the transmission component 1004 may be co-located with the reception component 1002 in a transceiver.

The reception component 1002 may receive, from a base station or an RSU, information associated with one or more security keys for sidelink communications, wherein the information includes at least one of a base key, the one or more security keys, or one or more parameters for deriving the one or more security keys. The transmission component 1004 may transmit, to a second UE, a sidelink communication that is scrambled using a security key of the one or more security keys.

The key generation component 1008 may generate, using a key generation function, the security key based at least in part on the one or more parameters and the base key.

The reception component 1002 may receive, from the base station or the RSU, configuration information indicating the key generation function.

The information scrambling component 1010 may generate a scrambling sequence using the security key. The information scrambling component 1010 may scramble the sidelink communication using the scrambling sequence.

The transmission component 1004 may transmit, to the second UE, an SCI-2 communication that is scrambled using the different security key.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
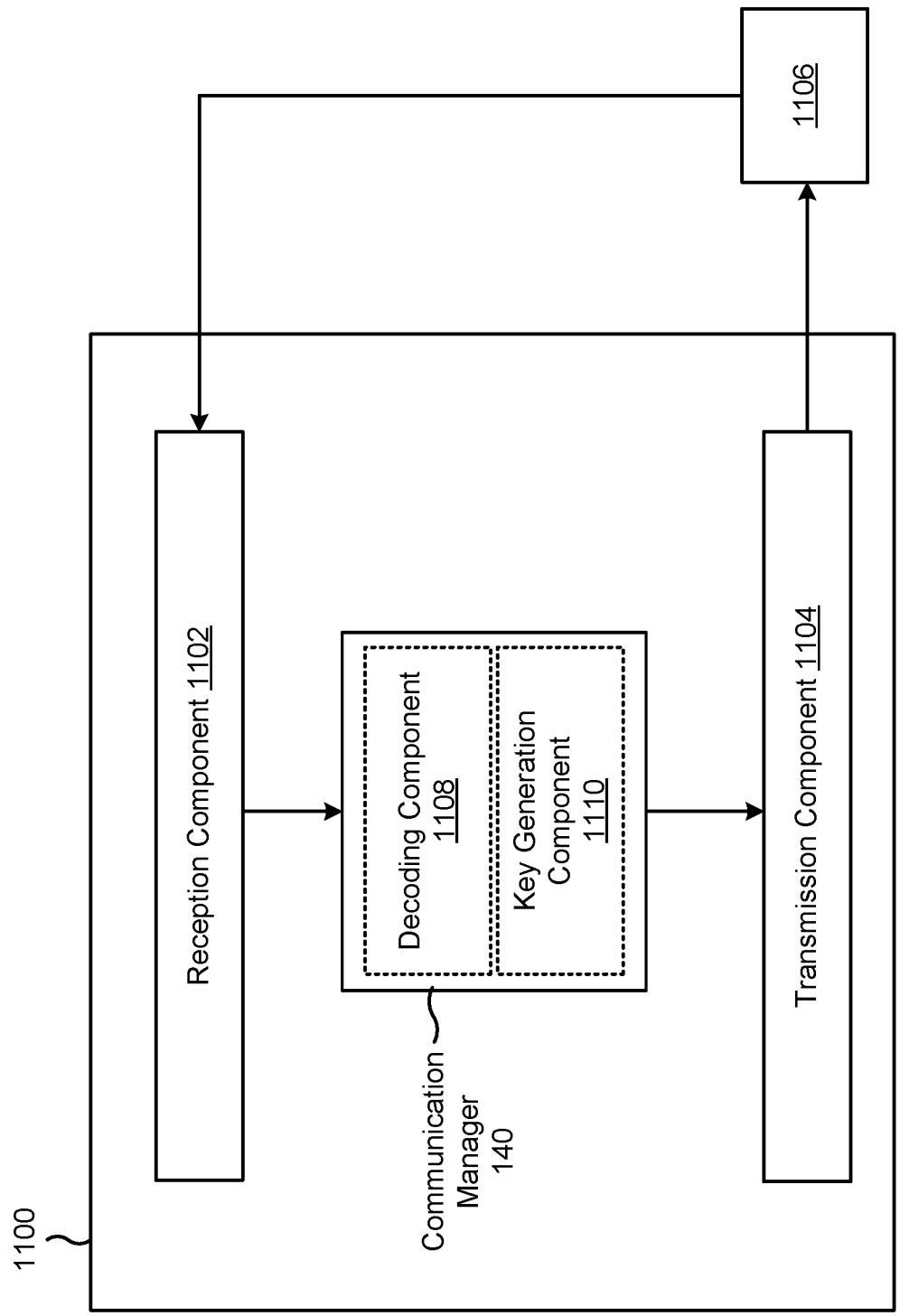

FIG. 11 is a diagram of an example apparatus 1100 for wireless communication. The apparatus 1100 may be a UE, or a UE may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 140. The communication manager 140 may include one or more of a decoding component 1108, and/or a key generation component 1110, among other examples.

In some aspects, the apparatus 1100 may be configured to perform one or more operations described herein in connection with FIGS. 6 and 7. Additionally, or alternatively, the apparatus 1100 may be configured to perform one or more processes described herein, such as process 900 of FIG. 9, or a combination thereof. In some aspects, the apparatus 1100 and/or one or more components shown in FIG. 11 may include one or more components of the UE described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the UE described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the UE described in connection with FIG. 2. In some aspects, the transmission component 1104 may be co-located with the reception component 1102 in a transceiver.

The reception component 1102 may receive, from a base station or an RSU, information associated with one or more security keys for sidelink communications, wherein the information includes at least one of a base key, the one or more security keys, or one or more parameters for deriving the one or more security keys. The reception component 1102 may receive, from a second UE, a sidelink communication that is scrambled using a security key of the one or more security keys. The decoding component 1108 may decode the sidelink communication based at least in part on at least one of the security key or the information.

The key generation component 1110 may generate, using a key generation function, the security key based at least in part on the one or more parameters and the base key.

The reception component 1102 may receive, from the base station or the RSU, configuration information indicating the key generation function.

The key generation component 1110 may generate a scrambling sequence using the security key.

The reception component 1102 may receive, from the second UE, an SCI-2 communication that is scrambled using the different security key.

The decoding component 1108 may decode the SCI-2 communication using the different security key.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a first user equipment (UE), comprising: receiving, from a base station or a roadside unit (RSU), information associated with one or more security keys for sidelink communications, wherein the information includes at least one of a base key, the one or more security keys, or one or more parameters for deriving the one or more security keys; and transmitting, to a second UE, a sidelink communication that is scrambled using a security key of the one or more security keys.

Aspect 2: The method of Aspect 1, wherein receiving the information associated with the one or more security keys comprises: receiving an indication of at least one of: a validity parameter indicating an amount of time that the information is valid, a permutation index, or an indication of which stages or types of sidelink control information (SCI) are to be scrambled using the one or more security keys.

Aspect 3: The method of any of Aspects 1-2, wherein receiving the information associated with the one or more security keys comprises: receiving the information via at least one of a downlink control information message, a radio resource control message, or a medium access control message.

Aspect 4: The method of any of Aspects 1-3, wherein the one or more security keys include a first security key associated with a first stage sidelink control information (SCI) (SCI-1) and a second security key associated with a second stage SCI (SCI-2).

Aspect 5: The method of any of Aspects 1-4, further comprising: generating, using a key generation function, the security key based at least in part on the one or more parameters and the base key.

Aspect 6: The method of Aspect 5, wherein the key generation function is preconfigured on the first UE.

Aspect 7: The method of Aspect 5, further comprising: receiving, from the base station or the RSU, configuration information indicating the key generation function.

Aspect 8: The method of any of Aspects 5-7, wherein the key generation function is preconfigured on the first UE or indicated via configuration information, the method further comprising: receiving, from the base station or the RSU, a dynamic message indicating values for the one or more parameters to be used with the key generation function to derive the one or more security keys.

Aspect 9: The method of any of Aspects 1-8, wherein the one or more parameters include at least one of a cell identifier or a location zone identifier.

Aspect 10: The method of any of Aspects 1-9, further comprising: generating a scrambling sequence using the security key; and scrambling the sidelink communication using the scrambling sequence.

Aspect 11: The method of Aspect 10, wherein scrambling the sidelink communication comprises: scrambling all information included in the sidelink communication using the scrambling sequence.

Aspect 12: The method of Aspect 10, wherein the sidelink communication includes a set of fields, and wherein scrambling the sidelink communication comprises: scrambling information included in a subset of fields, of the set of fields, using the scrambling sequence.

Aspect 13: The method of Aspect 12, wherein the subset of fields includes at least one of a frequency resource assignment field, a resource reservation period field, or a modulation and coding scheme field.

Aspect 14: The method of any of Aspects 1-13, wherein the information is associated with the security key, and wherein the security key is associated with a first stage sidelink control information (SCI) (SCI-1).

Aspect 15: The method of Aspect 14, wherein the sidelink communication is an SCI-1 communication, and wherein transmitting the sidelink communication comprises: generating a different security key that is associated with a second stage SCI (SCI-2); and transmitting, to the second UE, the sidelink communication that is scrambled using the security key, wherein the sidelink communication indicates the different security key.

Aspect 16: The method of Aspect 15, further comprising: transmitting, to the second UE, an SCI-2 communication that is scrambled using the different security key.

Aspect 17: The method of any of Aspects 1-16, wherein the information is included in a most recently received downlink control information message, and wherein transmitting the sidelink communication comprises: transmitting the sidelink communication that is scrambled using the security key, wherein the security key is generated using the information based at least in part on the information being included in the most recently received downlink control information message.

Aspect 18: The method of any of Aspects 1-17, wherein the information includes a validity parameter indicating an amount of time that the information is valid, and wherein transmitting the sidelink communication comprises: transmitting the sidelink communication that is scrambled using the security key, wherein the security key is generated using the information based at least in part on the validity parameter indicating that the information is valid at a time when the sidelink communication is transmitted.

Aspect 19: The method of any of Aspects 1-18, wherein the sidelink communication is a sidelink control information message or a sidelink data message.

Aspect 20: A method of wireless communication performed by a first user equipment (UE), comprising: receiving, from a base station or a roadside unit (RSU), information associated with one or more security keys for sidelink communications, wherein the information includes at least one of a base key, the one or more security keys, or one or more parameters for deriving the one or more security keys; receiving, from a second UE, a sidelink communication that is scrambled using a security key of the one or more security keys; and decoding the sidelink communication based at least in part on at least one of the security key or the information.

Aspect 21: The method of Aspect 20, wherein receiving the information associated with the one or more security keys comprises: receiving an indication of at least one of: a validity parameter indicating an amount of time that the information is valid, a permutation index, or an indication of what stages or types of sidelink control information (SCI) are to be scrambled using the one or more security keys.

Aspect 22: The method of any of Aspects 20-21, wherein receiving the information associated with the one or more security keys comprises: receiving the information via at least one of a downlink control information message, a radio resource control message, or a medium access control message.

Aspect 23: The method of any of Aspects 20-22, wherein the one or more security keys include a first security key associated with a first stage sidelink control information (SCI) (SCI-1) and a second security key associated with a second stage SCI (SCI-2).

Aspect 24: The method of any of Aspects 20-23, further comprising: generating, using a key generation function, the security key based at least in part on the one or more parameters and the base key.

Aspect 25: The method of Aspect 24, wherein the key generation function is preconfigured on the first UE.

Aspect 26: The method of Aspect 24, further comprising: receiving, from the base station or the RSU, configuration information indicating the key generation function.

Aspect 27: The method of any of Aspects 24-26, wherein the key generation function is preconfigured on the first UE or indicated via configuration information, the method further comprising: receiving, from the base station or the RSU, a dynamic message indicating values for the one or more parameters to be used with the key generation function to derive the one or more security keys.

Aspect 28: The method of any of Aspects 20-27, wherein the one or more parameters include at least one of a cell identifier or a location zone identifier.

Aspect 29: The method of any of Aspects 20-28, further comprising: generating a scrambling sequence using the security key; and wherein decoding the sidelink communication comprises decoding the sidelink communication using the scrambling sequence.

Aspect 30: The method of any of Aspects 20-29, wherein decoding the sidelink communication comprises: decoding all information included in the sidelink communication using the security key.

Aspect 31: The method of any of Aspects 20-30, wherein the sidelink communication includes a set of fields, and wherein decoding the sidelink communication comprises: decoding information included in a subset of fields, of the set of fields, using the security key.

Aspect 32: The method of Aspect 31, wherein the subset of fields includes at least one of a frequency resource assignment field, a resource reservation period field, or a modulation and coding scheme field.

Aspect 33: The method of any of Aspects 20-32, wherein the information is associated with the security key, and wherein the security key is associated with a first stage sidelink control information (SCI) (SCI-1).

Aspect 34: The method of Aspect 33, wherein the sidelink communication is an SCI-1 communication, and wherein receiving the sidelink communication comprises: receiving, from the second UE, the sidelink communication that is scrambled using the security key, wherein the sidelink communication indicates a different security key that is generated by the second UE for second stage SCI (SCI-2); and wherein decoding the sidelink communication comprises: decoding the sidelink communication using the security key to obtain the different security key.

Aspect 35: The method of Aspect 34, further comprising: receiving, from the second UE, an SCI-2 communication that is scrambled using the different security key; and decoding the SCI-2 communication using the different security key.

Aspect 36: The method of any of Aspects 20-35, wherein the information is included in a most recently received downlink control information message, and wherein decoding the sidelink communication comprises: decoding the sidelink communication using the security key, wherein the security key is generated using the information based at least in part on the information being included in the most recently received downlink control information message.

Aspect 37: The method of any of Aspects 20-36, wherein the information includes a validity parameter indicating an amount of time that the information is valid, and wherein decoding the sidelink communication comprises: decoding the sidelink communication using the security key, wherein the security key is generated using the information based at least in part on the validity parameter indicating that the information is valid at a time when the sidelink communication is transmitted.

Aspect 38: The method of any of Aspects 20-37, wherein the sidelink communication is a sidelink control information message or a sidelink data message.

Aspect 39: An apparatus for wireless communication at a device, comprising a processor; memory coupled with the processor; and instructions stored in the memory and executable by the processor to cause the apparatus to perform the method of one or more of Aspects 1-19.

Aspect 40: A device for wireless communication, comprising a memory and one or more processors coupled to the memory, the one or more processors configured to perform the method of one or more of Aspects 1-19.

Aspect 41: An apparatus for wireless communication, comprising at least one means for performing the method of one or more of Aspects 1-19.

Aspect 42: A non-transitory computer-readable medium storing code for wireless communication, the code comprising instructions executable by a processor to perform the method of one or more of Aspects 1-19.

Aspect 43: A non-transitory computer-readable medium storing a set of instructions for wireless communication, the set of instructions comprising one or more instructions that, when executed by one or more processors of a device, cause the device to perform the method of one or more of Aspects 1-19.

Aspect 44: An apparatus for wireless communication at a device, comprising a processor; memory coupled with the processor; and instructions stored in the memory and executable by the processor to cause the apparatus to perform the method of one or more of Aspects 20-38.

Aspect 45: A device for wireless communication, comprising a memory and one or more processors coupled to the memory, the one or more processors configured to perform the method of one or more of Aspects 20-38.

Aspect 46: An apparatus for wireless communication, comprising at least one means for performing the method of one or more of Aspects 20-38.

Aspect 47: A non-transitory computer-readable medium storing code for wireless communication, the code comprising instructions executable by a processor to perform the method of one or more of Aspects 20-38.

Aspect 48: A non-transitory computer-readable medium storing a set of instructions for wireless communication, the set of instructions comprising one or more instructions that, when executed by one or more processors of a device, cause the device to perform the method of one or more of Aspects 20-38.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A first user equipment (UE) for wireless communication, comprising:
   one or more memories; and
   one or more processors, coupled to the one or more memories, configured to:
      receive, from a network entity or a roadside unit (RSU), information associated with one or more security keys for sidelink communications, wherein:
         the information includes at least one of a base key, the one or more security keys, or one or more parameters for deriving the one or more security keys,
         the one or more security keys include a first security key associated with a first stage sidelink control information (SCI) (SCI-1) and a second security key associated with a second stage SCI (SCI-2),
         the SCI-1 is transmitted on a physical sidelink control channel (PSCCH), and
         the SCI-2 is transmitted on a physical sidelink shared channel (PSSCH); and
      transmit, to a second UE, a sidelink communication that is scrambled at a physical (PHY) layer of the first UE using a security key of the one or more security keys.

2. The first UE of claim 1, wherein the one or more processors, to receive the information associated with the one or more security keys, are configured to:
   receive an indication of at least one of:
      a validity parameter indicating an amount of time that the information is valid,
      a permutation index, or which stages or types of sidelink control information (SCI) are to be scrambled using the one or more security keys.

3. The first UE of claim 1, wherein the one or more processors, to receive the information associated with the one or more security keys, are configured to:
receive the information via at least one of a downlink control information message, a radio resource control message, or a medium access control message.

4. The first UE of claim 1, wherein the one or more processors are further configured to:
generate, using a key generation function, the security key based at least in part on the one or more parameters and the base key.

5. The first UE of claim 4, wherein the key generation function is preconfigured on the first UE or indicated via configuration information, wherein the one or more processors are further configured to:
receive, from the network entity or the RSU, a dynamic message indicating values for the one or more parameters to be used with the key generation function to derive the one or more security keys.

6. The first UE of claim 1, wherein the one or more parameters include at least one of a cell identifier or a location zone identifier.

7. The first UE of claim 1, wherein the one or more processors are further configured to:
generate a scrambling sequence using the security key; and
scramble the sidelink communication using the scrambling sequence.

8. The first UE of claim 7, wherein the one or more processors, to scramble the sidelink communication, are configured to:
scramble all information included in the sidelink communication using the scrambling sequence.

9. The first UE of claim 7, wherein the sidelink communication includes a set of fields, and wherein the one or more processors, to scramble the sidelink communication, are configured to:
scramble information included in a subset of fields, of the set of fields, using the scrambling sequence.

10. The first UE of claim 1, wherein the sidelink communication is an SCI-1 communication, and wherein the one or more processors, to transmit the sidelink communication, are configured to:
generate a different security key that is associated with the SCI-2; and
transmit, to the second UE, the sidelink communication that is scrambled using the security key, wherein the sidelink communication indicates the different security key.

11. The first UE of claim 1, wherein the information is included in a most recently received downlink control information message, and wherein the one or more processors, to transmit the sidelink communication, are configured to:
transmit the sidelink communication that is scrambled using the security key, wherein the security key is generated using the information based at least in part on the information being included in the most recently received downlink control information message.

12. The first UE of claim 1, wherein the information includes a validity parameter indicating an amount of time that the information is valid, and wherein the one or more processors, to transmit the sidelink communication, are configured to:
transmit the sidelink communication that is scrambled using the security key, wherein the security key is generated using the information based at least in part on the validity parameter indicating that the information is valid at a time when the sidelink communication is transmitted.

13. A method of wireless communication performed by a first user equipment (UE), comprising:
receiving, from a network entity or a roadside unit (RSU), information associated with one or more security keys for sidelink communications, wherein:
the information includes at least one of a base key, the one or more security keys, or one or more parameters for deriving the one or more security keys,
the one or more security keys include a first security key associated with a first stage sidelink control information (SCI) (SCI-1) and a second security key associated with a second stage SCI (SCI-2),
the SCI-1 is transmitted on a physical sidelink control channel (PSCCH), and
the SCI-2 is transmitted on a physical sidelink shared channel (PSSCH); and
transmitting, to a second UE, a sidelink communication that is scrambled at a physical (PHY) layer of the first UE using a security key of the one or more security keys.

14. The method of claim 13, wherein receiving the information associated with the one or more security keys comprises:
receiving an indication of at least one of:
a validity parameter indicating an amount of time that the information is valid,
a permutation index, or
which stages or types of sidelink control information (SCI) are to be scrambled using the one or more security keys.

15. The method of claim 13, wherein receiving the information associated with the one or more security keys comprises:
receiving the information via at least one of a downlink control information message, a radio resource control message, or a medium access control message.

16. The method of claim 13, further comprising:
generating, using a key generation function, the security key based at least in part on the one or more parameters and the base key.

17. The method of claim 16, wherein the key generation function is preconfigured on the first UE or indicated via configuration information, the method further comprising:
receiving, from the network entity or the RSU, a dynamic message indicating values for the one or more parameters to be used with the key generation function to derive the one or more security keys.

18. The method of claim 13, wherein the one or more parameters include at least one of a cell identifier or a location zone identifier.

19. The method of claim 13, further comprising:
generating a scrambling sequence using the security key; and
scrambling the sidelink communication using the scrambling sequence.

20. The method of claim 19, wherein scrambling the sidelink communication comprises:
scrambling all information included in the sidelink communication using the scrambling sequence.

21. The method of claim 19, wherein the sidelink communication includes a set of fields, and wherein scrambling the sidelink communication comprises:
scrambling information included in a subset of fields, of the set of fields, using the scrambling sequence.

22. The method of claim 13, wherein the sidelink communication is an SCI-1 communication, and wherein transmitting the sidelink communication comprises:
generating a different security key that is associated with the SCI-2; and
transmitting, to the second UE, the sidelink communication that is scrambled using the security key, wherein the sidelink communication indicates the different security key.

23. The method of claim 13, wherein the information is included in a most recently received downlink control information message, and wherein transmitting the sidelink communication comprises:
transmitting the sidelink communication that is scrambled using the security key, wherein the security key is generated using the information based at least in part on the information being included in the most recently received downlink control information message.

24. The method of claim 13, wherein the information includes a validity parameter indicating an amount of time that the information is valid, and wherein transmitting the sidelink communication comprises:
transmitting the sidelink communication that is scrambled using the security key, wherein the security key is generated using the information based at least in part on the validity parameter indicating that the information is valid at a time when the sidelink communication is transmitted.

25. A non-transitory computer-readable medium storing a set of instructions for wireless communication, the set of instructions comprising:
one or more instructions that, when executed by one or more processors of a first user equipment (UE), cause the first UE to:
receive, from a network entity or a roadside unit (RSU), information associated with one or more security keys for sidelink communications, wherein:
the information includes at least one of a base key, the one or more security keys, or one or more parameters for deriving the one or more security keys,
the one or more security keys include a first security key associated with a first stage sidelink control information (SCI) (SCI-1) and a second security key associated with a second stage SCI (SCI-2),
the SCI-1 is transmitted on a physical sidelink control channel (PSCCH), and
the SCI-2 is transmitted on a physical sidelink shared channel (PSSCH); and
transmit, to a second UE, a sidelink communication that is scrambled at a physical (PHY) layer of the first UE using a security key of the one or more security keys.

26. The non-transitory computer-readable medium of claim 25, wherein the one or more instructions, that cause the first UE to receive the information associated with the one or more security keys, cause the first UE to:
receive an indication of at least one of:
a validity parameter indicating an amount of time that the information is valid,
a permutation index, or
which stages or types of sidelink control information (SCI) are to be scrambled using the one or more security keys.

27. The non-transitory computer-readable medium of claim 25, wherein the one or more instructions, that cause the first UE to receive the information associated with the one or more security keys, cause the first UE to:
receive the information via at least one of a downlink control information message, a radio resource control message, or a medium access control message.

28. An apparatus for wireless communication, comprising:
means for receiving, from a network entity or a roadside unit (RSU), information associated with one or more security keys for sidelink communications, wherein:
the information includes at least one of a base key, the one or more security keys, or one or more parameters for deriving the one or more security keys,
the one or more security keys include a first security key associated with a first stage sidelink control information (SCI) (SCI-1) and a second security key associated with a second stage SCI (SCI-2),
the SCI-1 is transmitted on a physical sidelink control channel (PSCCH), and
the SCI-2 is transmitted on a physical sidelink shared channel (PSSCH); and
means for transmitting, to a user equipment (UE), a sidelink communication that is scrambled at a physical layer of the apparatus using a security key of the one or more security keys.

29. The apparatus of claim 28, wherein the means for receiving the information associated with the one or more security keys comprises:
means for receiving an indication of at least one of:
a validity parameter indicating an amount of time that the information is valid,
a permutation index, or
which stages or types of sidelink control information (SCI) are to be scrambled using the one or more security keys.

30. The apparatus of claim 28, wherein the means for receiving the information associated with the one or more security keys comprises:
means for receiving the information via at least one of a downlink control information message, a radio resource control message, or a medium access control message.

* * * * *